United States Patent
Fein et al.

(10) Patent No.: US 7,685,248 B1
(45) Date of Patent: *Mar. 23, 2010

(54) USER INTERFACE IN DATA FORWARDING NETWORK

(76) Inventors: Gene Fein, 24753 Vantage Point Ter., Malibu, CA (US) 90265; Edward Merritt, 139 Lime Kiln Rd., Lenox, MA (US) 01240

( * ) Notice: Subject to any disclaimer, the term of this patent is extended or adjusted under 35 U.S.C. 154(b) by 0 days.

This patent is subject to a terminal disclaimer.

(21) Appl. No.: 12/390,161

(22) Filed: Feb. 20, 2009

Related U.S. Application Data

(63) Continuation of application No. 12/240,885, filed on Sep. 29, 2008.

(51) Int. Cl.
*G06F 15/167* (2006.01)

(52) U.S. Cl. .................................................... 709/212

(58) Field of Classification Search ................ 709/201, 709/212; 711/100–146; 707/1–10; 715/700–866
See application file for complete search history.

(56) References Cited

U.S. PATENT DOCUMENTS

| | | | | |
|---|---|---|---|---|
| 5,787,258 | A * | 7/1998 | Costa et al. ................. | 709/251 |
| 6,151,395 | A * | 11/2000 | Harkins ....................... | 380/286 |
| 6,684,258 | B1 * | 1/2004 | Gavin et al. ................ | 709/251 |
| 7,035,933 | B2 * | 4/2006 | O'Neal et al. ............... | 709/233 |
| 7,120,631 | B1 | 10/2006 | Vahalia et al. ............... | 707/8 |
| 7,143,170 | B2 * | 11/2006 | Swildens et al. ............ | 709/226 |
| 7,191,298 | B2 | 3/2007 | Kaminsky et al. .......... | 711/162 |
| 7,327,731 | B1 | 2/2008 | Kumar et al. ............... | 370/390 |
| 7,404,002 | B1 * | 7/2008 | Pereira ........................ | 709/231 |
| 7,428,540 | B1 | 9/2008 | Coates et al. ............... | 707/200 |
| 7,529,784 | B2 * | 5/2009 | Kavuri et al. ............... | 707/204 |
| 2002/0194371 | A1 * | 12/2002 | Kadoi .......................... | 709/239 |
| 2003/0101200 | A1 * | 5/2003 | Koyama et al. ............. | 707/200 |
| 2004/0223503 | A1 * | 11/2004 | Lynch et al. ................ | 370/404 |
| 2005/0071568 | A1 * | 3/2005 | Yamamoto et al. .......... | 711/133 |
| 2005/0201409 | A1 * | 9/2005 | Griswold et al. ............ | 370/445 |
| 2005/0243823 | A1 * | 11/2005 | Griswold et al. ............ | 370/389 |
| 2006/0031593 | A1 * | 2/2006 | Sinclair ....................... | 709/251 |
| 2006/0242212 | A1 | 10/2006 | Brinkmann et al. ......... | 711/148 |
| 2007/0005694 | A1 * | 1/2007 | Popkin et al. ............... | 709/204 |
| 2007/0050761 | A1 * | 3/2007 | Hester et al. ................ | 717/168 |
| 2007/0079087 | A1 | 4/2007 | Wang et al. ................. | 711/161 |
| 2007/0195772 | A1 * | 8/2007 | Shadish ....................... | 370/390 |
| 2009/0063419 | A1 * | 3/2009 | Nurminen et al. ............ | 707/3 |
| 2009/0067322 | A1 * | 3/2009 | Shand et al. ................ | 370/225 |
| 2009/0092124 | A1 * | 4/2009 | Singhal et al. .............. | 370/351 |

\* cited by examiner

*Primary Examiner*—J Bret Dennison
(74) *Attorney, Agent, or Firm*—Chinh H. Pham; Bruce T. Neel; Greenberg Traurig, LLP

(57) ABSTRACT

Methods and apparatus, including computer program products, for data forwarding storage. A user system communicates with a network of interconnected computer system nodes. The user system includes an input/output device including a user interface to initiate the sending of a request from the user system to store data on the network of nodes; to control at least one function of storage of the data in the network of nodes, wherein the data is continuously forwarded from one node memory to another node memory in the network without storing on any physical storage device in the network; and to display information regarding file storage in the network.

20 Claims, 22 Drawing Sheets

USER INTERFACE IN DATA FORWARDING NETWORK

CROSS-REFERENCE TO RELATED APPLICATIONS

This application is a continuation of U.S. application Ser. No. 12/240,885, filed Sep. 29, 2008, titled "User Interface In Data Forwarding Network," herein incorporated by reference in its entirety. The present patent application is related to the following applications and each is herein incorporated by reference in its entirety: U.S. Ser. No. 12/046,757, filed on Mar. 12, 2008; U.S. Ser. No. 12/052,345, filed on Mar. 20, 2008; U.S. Ser. No. 12/132,804, filed Jun. 4, 2008; U.S. Ser. No. 12/099,498, filed on Apr. 8, 2008; U.S. Ser. No. 12/109,458, filed Apr. 25, 2008; U.S. Ser. No. 12/329,253, filed Dec. 5, 2008; U.S. Ser. No. 12/116,610, filed May 7, 2008; U.S. Ser. No. 12/329,285, filed Dec. 5, 2008; U.S. Ser. No. 12/170,901, filed Jul. 10, 2008; U.S. Ser. No. 12/170,925, filed on Jul. 10, 2008; U.S. Ser. No. 12/184,866, filed on Aug. 1, 2008; U.S. Ser. No. 12/240,951, filed on Sep. 29, 2008; U.S. Ser. No. 12/241,032, filed on Sep. 29, 2008; U.S. Ser. No. 12/241,003, filed on Sep. 29, 2008; U.S. Ser. No. 12/240,925, filed on Sep. 29, 2008; U.S. Ser. No. 12/240,991, filed Apr. 25, 2008; U.S. Ser. No. 12/240,967, filed on Sep. 29, 2008; and U.S. Ser. No. 12/240,757, filed on Sep. 29, 2008.

BACKGROUND

At least some embodiments disclosed herein relate to data storage, and more particularly, to a user interface for usage with a data forwarding storage system.

The volume of data that must be stored by individuals, organizations, businesses and government is growing every year. In addition to just keeping up with demand, organizations face other storage challenges. With the move to on-line, real-time business and government, critical data must be protected from loss or inaccessibility due to software or hardware failure. Today, many storage products do not provide complete failure protection and expose users to the risk of data loss or unavailability. For example, many storage solutions on the market today offer protection against some failure modes, such as processor failure, but not against others, such as disk drive failure. Many organizations are exposed to the risk of data loss or data unavailability due to component failure in their data storage system.

The data storage market is typically divided into two major segments, i.e., Direct Attached Storage (DAS) and Network Storage. DAS includes disks connected directly to a server.

Network Storage includes disks that are attached to a network rather than a specific server and can then be accessed and shared by other devices and applications on that network. Network Storage is typically divided into two segments, i.e., Storage Area Networks (SANs) and Network Attached Storage (NAS).

A SAN is a high-speed special-purpose network (or subnetwork) that interconnects different kinds of data storage devices with associated data servers on behalf of a larger network of users. Typically, a SAN is part of the overall network of computing resources for an enterprise. A storage area network is usually clustered in close proximity to other computing resources but may also extend to remote locations for backup and archival storage, using wide area (WAN) network carrier technologies.

NAS is hard disk storage that is set up with its own network address rather than being attached to the local computer that is serving applications to a network's workstation users. By removing storage access and its management from the local server, both application programming and files can be served faster because they are not competing for the same processor resources. The NAS is attached to a local area network (typically, an Ethernet network) and assigned an IP address. File requests are mapped by the main server to the NAS file server.

All of the above share one common feature that can be an Achilles tendon in more ways than one, i.e., data is stored on a physical medium, such as a disk drive, CD drive, and so forth.

SUMMARY OF THE DESCRIPTION

The present invention provides methods and apparatus, including computer program products, for a user interface for usage in a data forwarding storage system. In general, in one aspect, the invention features, a method comprising, in a user system having a user interface, the user system configured to communicate with a network of interconnected computer system nodes, sending a request, initiated from the user interface, from the user system to store data on the network of interconnected computer system nodes; sending the data to a node memory in the network of interconnected computer system nodes; and controlling at least one function, via the user interface, of storage of the data in the network of interconnected computer system nodes, wherein the data is continuously forwarded from one node memory to another node memory in the network of interconnected computer system nodes without storing on any physical storage device in the network, and wherein the user interface is configured to display information regarding file storage in the network of interconnected computer system nodes.

In another aspect, the invention features a user system, configured to communicate with a network of interconnected computer system nodes, the user system comprising an input/output device including a user interface configured to initiate the sending of a request from the user system to store data on the network of interconnected computer system nodes; to control at least one function of storage of the data in the network of interconnected computer system nodes, wherein the data is continuously forwarded from one node memory to another node memory in the network of interconnected computer system nodes without storing on any physical storage device in the network; and to display information regarding file storage in the network of interconnected computer system nodes. The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

The embodiments are illustrated by way of example and not limitation in the FIGs. of the accompanying drawings in which like references indicate similar elements.

DETAILED DESCRIPTION

Unlike peer to peer networks, which use data forwarding in a transient fashion so that data is eventually stored on a physical medium such as a disk drive, the present invention is a continuous data forwarding system, i.e., data is stored by continually forwarding it from one node memory to another node memory.

Figure 1:
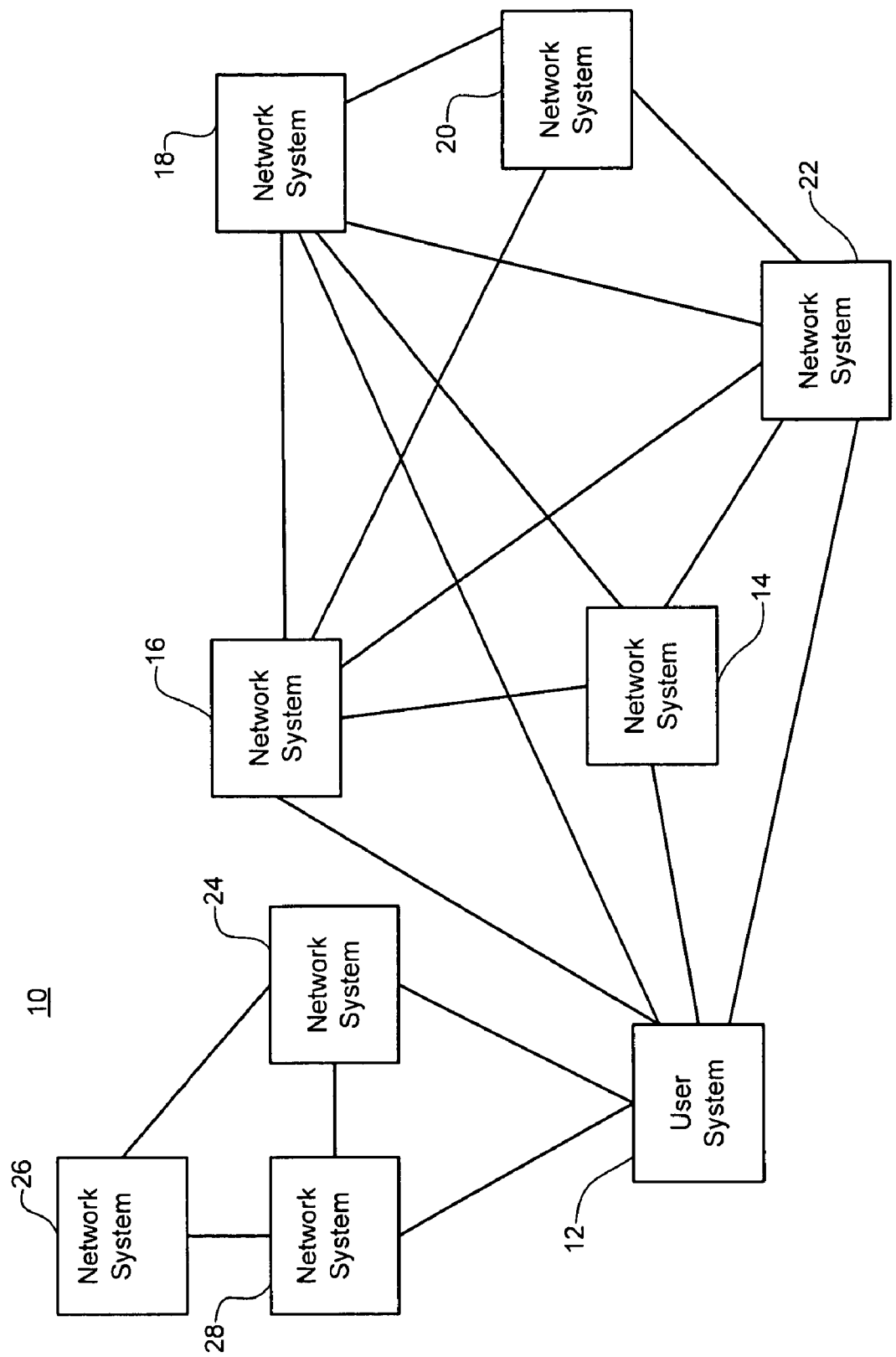
FIG. 1 is a block diagram of an exemplary network.

As shown in FIG. 1, an exemplary network 10 includes a user system 12 and a number of network systems 14, 16, 18, 20, 22. Each of the network systems 14, 16, 18, 20, 22 can be considered to be a node in the network 10 and one such network system may be designated as a central server, such as network system 14, which may assume a control position in network 10. Each of the nodes 14, 16, 18, 20, 22 may be established as a privately controlled network of peers under direct control of the central server 14. Peered nodes may also be a mix of private and public nodes, and thus not under the direct physical control of the central server 14. The network 10 may also be wholly public where the central server 14 (or servers) has no direct ownership or direct physical control of any of the peered nodes.

Figure 2:
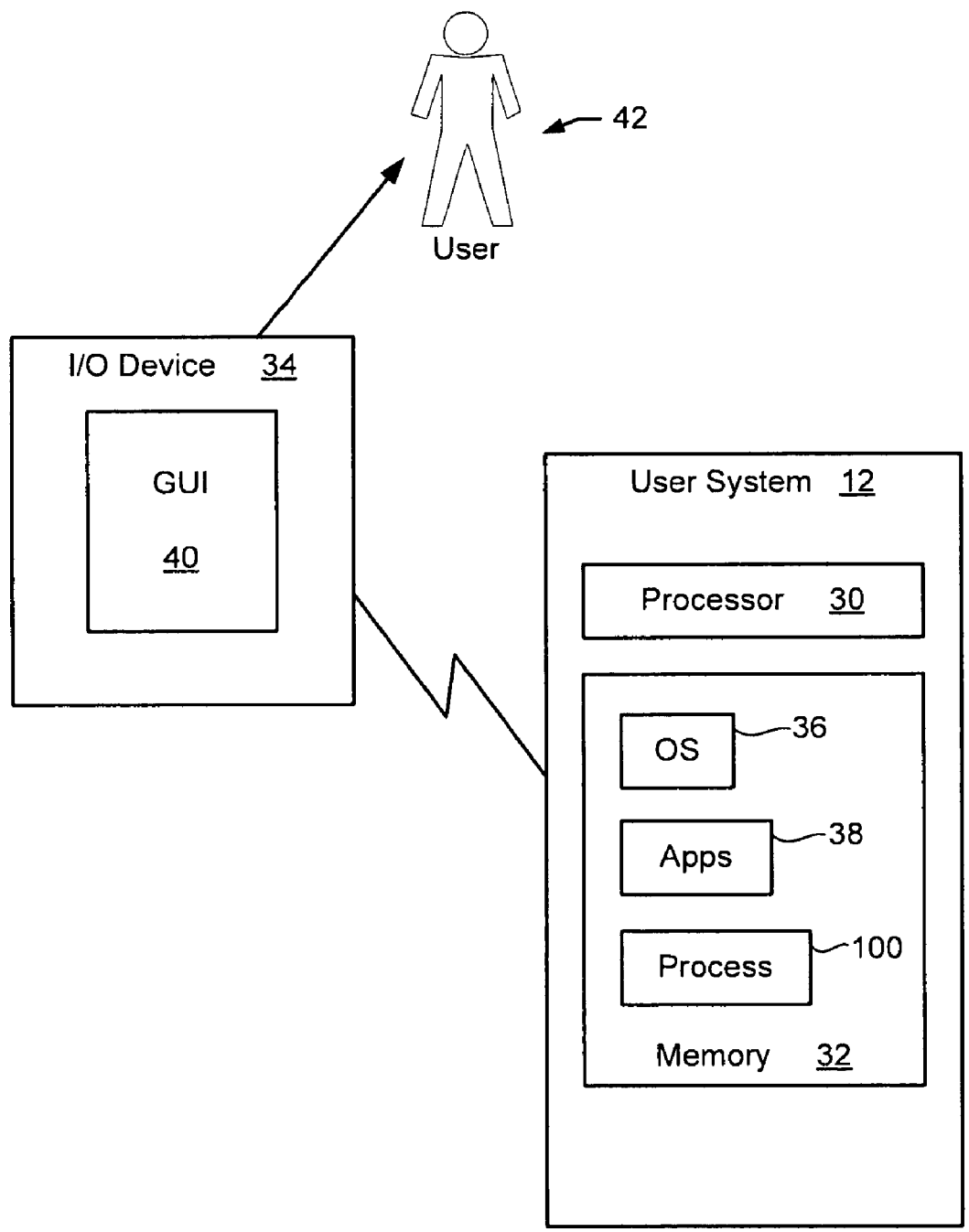
FIG. 2 is a block diagram of an exemplary user system.

In one example, nodes 14, 16, 18, 20 and 22 are considered to be a private network. In a private network, an administrator controls the nodes and may designate which node is the central server. The network 10 can also include one or more additional nodes. For example, nodes 24, 26 and 28. These nodes 24, 26 and 28 are considered to be part of one or more public networks in which the administrator has little or no control. As shown in FIG. 2, the user system 12 can include a processor 30, memory 32 and input/output (I/O) device 34. Memory 32 can include an operating system (OS) 36, such as Linux, Apple® OS or Windows®, one or more application processes 38, and a storage process 100, explained in detail below. Application processes 38 can include user productivity software, such as OpenOffice or Microsoft™ Office. The I/O device 34 can include a graphical user interface (GUI) 40 for display to a user 42. I/O device 34 may be, for example, a user desktop monitor. I/O device 34 may also be, for example, a portable wireless device having a user screen that displays GUI 40. In other embodiments, GUI 40 is in the form of a user interface (U) 2000 (see FIGS. 19-23, discussed further below) that permits user 42 to interact with and control various functions, depending on the embodiment, of the various embodiments of the data forwarding storage system described herein.

In various embodiments, numerous forms of programming for and formats for display of user interfaces may be used with GUI 40, including, for example, the following: Flash, HTML, usage of scripts, etc. Also, numerous user interface formats may be used for GUI 40 in a wide variety of variations depending on the specific user application. Examples may include the following formats: circular, box, voice recognition, virtual world GUI (e.g., a user interface for secondlife-.com), etc.

Figure 3:
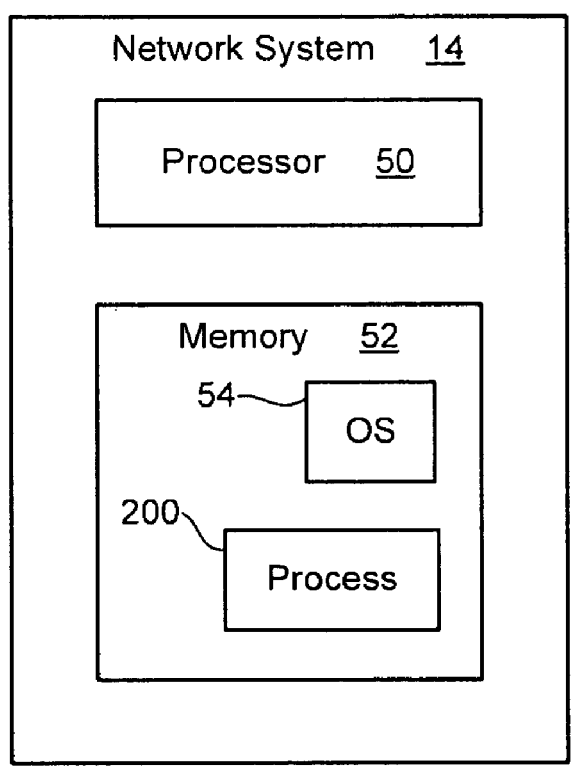
FIG. 3 is a block diagram of an exemplary network system.

Although GUI 40 is a graphical interface, in other embodiments other non-graphical forms of interfaces may be used. Also, non-graphical interfaces may be used in combination with a graphical UI. Examples of other graphical interfaces include graphical wheel formats, cubed and other shapes, and three-dimensional representations (e.g., via 3D graphic UIs). Examples of other types of interfaces include keypad formats, and voice-activated UIs. In yet further embodiments, other user interfaces may be used instead of or along with GUI 40 or UI 2000 (discussed below) such as any other user interface that executes a named system function(s) (e.g., function of network 10 in any embodiment described herein) via any combination of the user interface methods described herein, and also any other intuitive interfaces that may be used to execute system functions. As shown in FIG. 3, each of the network systems, such as network system 14, can include a processor 50 and memory 52. Memory 52 can include an OS 54, such as Linux, Apple® OS or Windows®, and a data forwarding process 200, explained in detail below. In other embodiments, discussed in more detail below, one or more network systems may also include a process 1300 (not shown in FIG. 3; see FIG. 6 below).

In traditional systems, application processes 38 need to store and retrieve data. In these traditional systems, data is stored on local or remote physical devices. And in some systems, this data can be segmented into different pieces or packets and stored locally or remotely on physical mediums of storage. Use of fixed physical data storage devices add cost, maintenance, management and generate a fixed physical record of the data, whether or not that is the desire of the user 42.

The present invention does not use fixed physical data storage to store data. When a request to store data is received by the central server 14 from storage process 100, data is directed to a node in the network 10 where it is then continuously forwarded from node memory to node memory in the network 10 by the data forwarding process 200 in each of the network nodes without storing on any physical storage medium such as a disk drive. The forwarded data resides only for a very brief period of time in the memory of any one node in the network 10. Data is not stored on any physical storage medium in any network node.

In a like manner, when a request to retrieve data is received by the central server 14 from storage process 100, the requested data, which is being forwarded from node memory to node memory in the network 10, is retrieved.

Data forwarded in this manner can be segmented and segments forwarded as described above. Sill, the segmented data is not stored on any physical storage medium in any network node, but merely forwarded from the memory of one node to the memory of another node.

Figure 4:
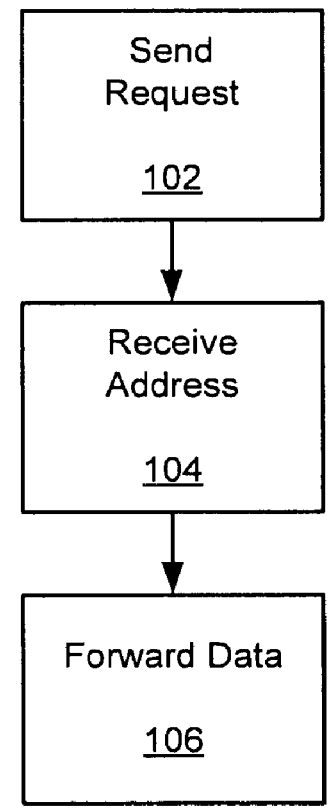
FIG. 4 is a flow diagram of a process.

As shown in FIG. 4, storage process 100 includes sending (102) a request to a central server 14 to store or retrieve data. If the request is a retrieve data request, storage process 100 receives the requested data from the central server 14 or node in the network. If the request to the central server 14 is a store data request, storage process 100 receives (104) an address of a node from the central server 14 and forwards (106) the data to the node memory represented by the received address.

Figure 5:
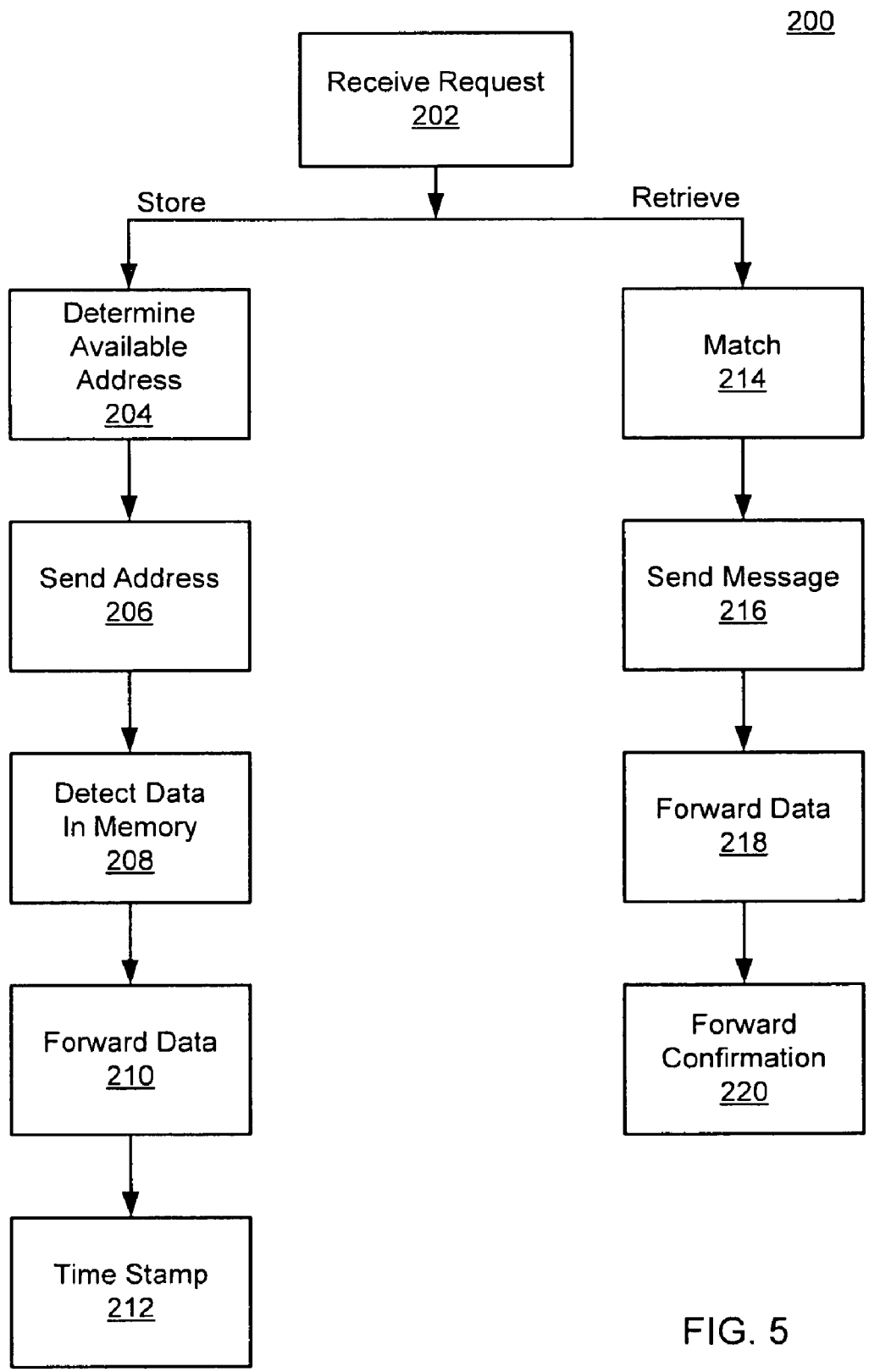
FIG. 5 is a flow diagram of a process.

As shown in FIG. 5, data forwarding process 200 includes receiving (202) a request to store or retrieve data. If the received request is a request to store data, data forwarding process 200 determines (204) an address of a node available to receive the data in memory. This determination (204) can include pinging the network and determining which of the nodes in a network is available, or determining which node in the network has the least traffic, or determining which node in the network has the largest available memory, or any combination of these or other factors.

Process 200 sends (206) a message to the user system with the address of a specific node for the requester to forward the data.

Process 200 detects (208) the presence of data in node memory. Process 200 forwards (210) the data in memory to another node in the network of nodes and continues to repeat detecting (208) and forwarding (210) of the data from node memory to node memory. When data arrives in any node memory, process 200 affixes (212) a time stamp to the data. Forwarding (210) can include pinging the node in the network to determine which of the nodes in the network is available, or determining which node in the network has the least traffic, or determining which node in the network has the largest available memory, or any combination of these or other factors.

In one specific example, at the point of entry to a node, data undergoes an encrypted "handshake" with the node or central server 14 or user. This can be a public or private encryption system, such as the Cashmere system, which can use public-private keys. Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path.

In another example, other routing schemes are utilized.

If the received request is a request to retrieve data being continuously forwarded from node memory to node memory, data forwarding process 200 matches (214) at the central server 14 using a hash mark or other unique code that can be "sniffed" by the node upon the data entering the node via the encryption handshake. This can occur by pinging the nodes in the network. Process 200 sends (216) the message to return the data to the user directly to the node or node state where the central server 14 believes the data will likely appear. The more the central server 14 can narrow the node state that it pings to, then the more efficient the retrieval will become and the less burdened by unnecessary messaging traffic to nodes that are not necessary for a transaction between the central server 14 and the node capable of forwarding the data.

Once the correct node receives the message to forward the data in node memory to the requester, process 200 forwards (218) in node memory the data to the requester and forwards (220) a confirmation message that the data has been sent to the user. This routing message may be sent directly to the central server 14 or may be passed to the central server 14 or servers via other node(s) or supernode(s) in the network 10. Upon the user receiving the requested data, the user's application functions to automatically ping the central server 14 that the data requested has been received. Thus, the network 10 creates data storage without caching, downloading and/or storing the data on any physical storage medium. Data storage and management is accomplished via a continuous routing of the data from node memory to node memory, the forwarded data only downloaded when the user requests the data to be returned to the user from the network 10.

New nodes and node states may be added and/or deleted from the network 10 based upon performance. Users may have access to all nodes or may be segmented to certain nodes or "node states" by the central server(s) or via the specific architecture of the private, public or private-public network.

Individual nodes, nodes states and supernodes may also be extranet peers, wireless network peers, satellite-peered nodes, Wi-Fi peered nodes, broadband networks, and so forth, in public or private networks. Peered nodes or users may be used as routing participants in the network 10 from any valid peer point with the same security systems employed, as well as custom solutions suitable for the rigors of specific deployments, such as wireless encryption schemes for wireless peers, and so forth.

In process 200, rather than have data cached or held in remote servers, hard drives or other fixed storage medium, the data are passed, routed, forwarded from node memory to node memory. The data are never downloaded until the authorized user calls for the data. A user on the system may authorize more than one user to have access to the data.

A primary goal in process 200 is to generate a data storage and management system where the data is never fixed in physical storage, but in fact, is continually being routed/forwarded from node memory to node memory in the network. The path of the nodes to which data is forwarded may also be altered by the central server 14 to adjust for system capacities and to eliminate redundant paths of data that may weaken the security of the network due to the increased probability of data path without this feature.

User Interface

FIGS. 19-23 illustrate user interface 2000, mentioned above. In this embodiment, UI 2000 permits user 42 to determine generally how user's 42 data is stored on various systems, for example, operated by user 42 or under the control of user 42. For example, UI 2000 permits user 42 to see listings of its files with an indication of where such files are stored (e.g., stored locally versus stored in network 10 using data forwarding storage). UI 2000 also provides options for user 42 to move files and documents from one storage location to another (optionally including in some embodiments the storage of redundant copies of files in fixed physical storage and/or data forwarding storage). Providing user 42 the ability to organize user's 42 various forms of data using UI 2000 may ease the integration of data forwarding storage with user's 42 other existing or future forms of data storage.

In one embodiment, UI 2000 provides various file deletion options, options to store files publicly or privately, options for tracing the current locations of files, and yet other options to control the various functions of network 10 described below.

Figure 19:
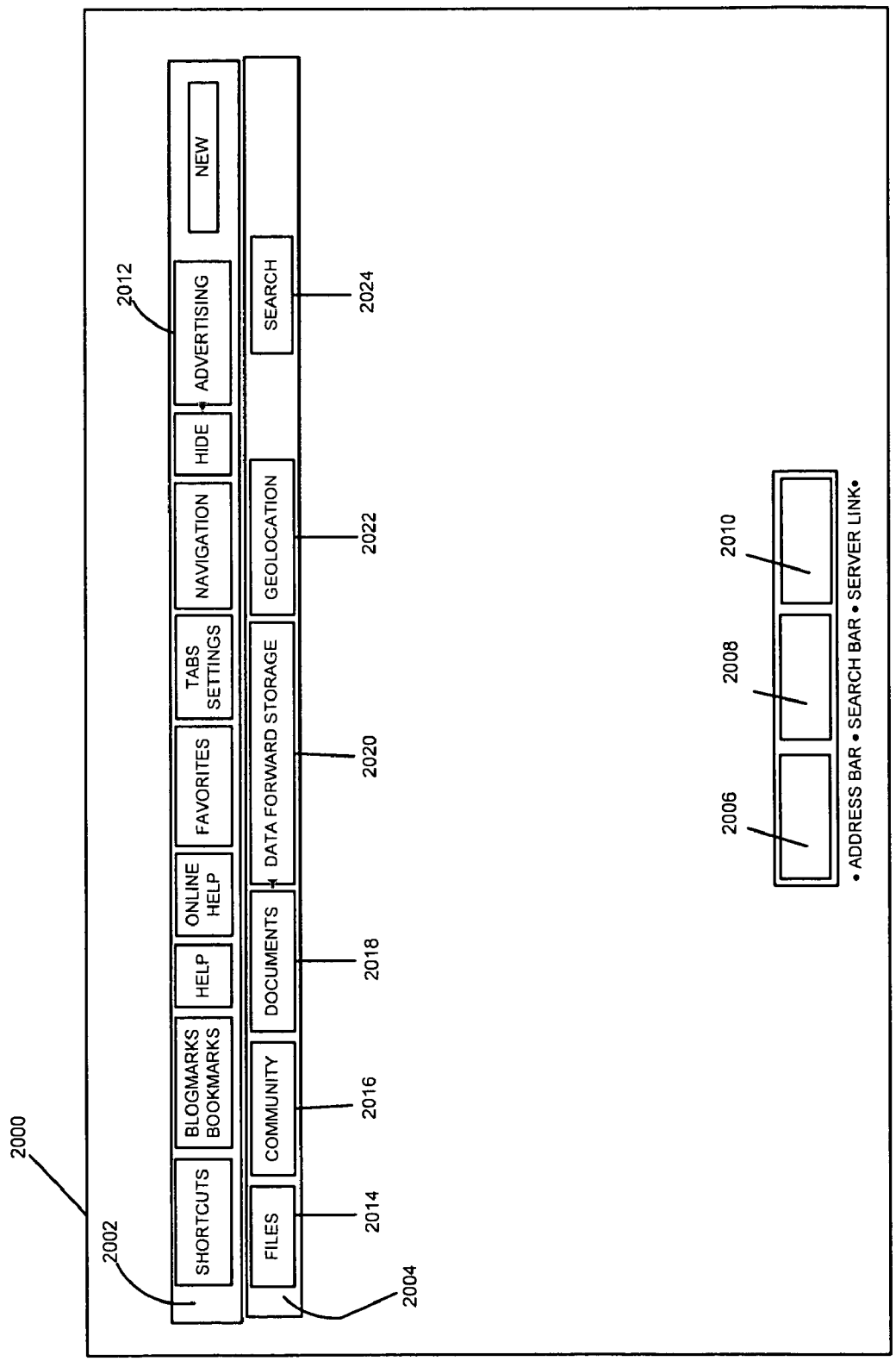
FIGS. 19-23 illustrate an exemplary user interface.

FIG. 19 illustrates a user screen or window of UI 2000 (e.g., a high-level menu screen). UI 2000 has menu bars 2002 and 2004, and also address bar 2006, search bar 2008, and server link button 2010. Address bar 2006 is a browser address bar. Search bar 2008 activates searching for related functions of the data forwarding storage service and related documents. Server link button 2010 accesses the system for user 42 to send or retrieve files (e.g., to and from a network system). Menu bar 2002 includes advertising button 2012, and also may include various other user button selections. Menu bar 2004 has buttons 2014, 2016, 2018, 2020, 2022, and 2024 that may be activated by user 42 to open various sub-windows, discussed below. In other embodiments, instead of simple UI buttons as described here, other user input modalities may be used to accept user input such as, for example, graphical wheel formats, keypad formats, cubed and other shapes to actualize specific compartmentalized functions of the user interface, three-dimensional representations via 3D-graphic UIs, and voice-activated UIs (e.g., used instead of or in conjunction with one or more of the foregoing). These input modalities may be used in UI 2000 to control one or more of the functions related to the various data forwarding storage embodiments described in this application.

User 42 can select or activate an advertising button 2012 in order to see, retrieve, or block various forms of advertising (e.g., to block advertisements received from network 10). In one embodiment, advertising button 2012 displays to user 42 one or more UI windows or screens for controlling one or more of the advertising forwarding and retrieval functions described later below.

Figure 20:
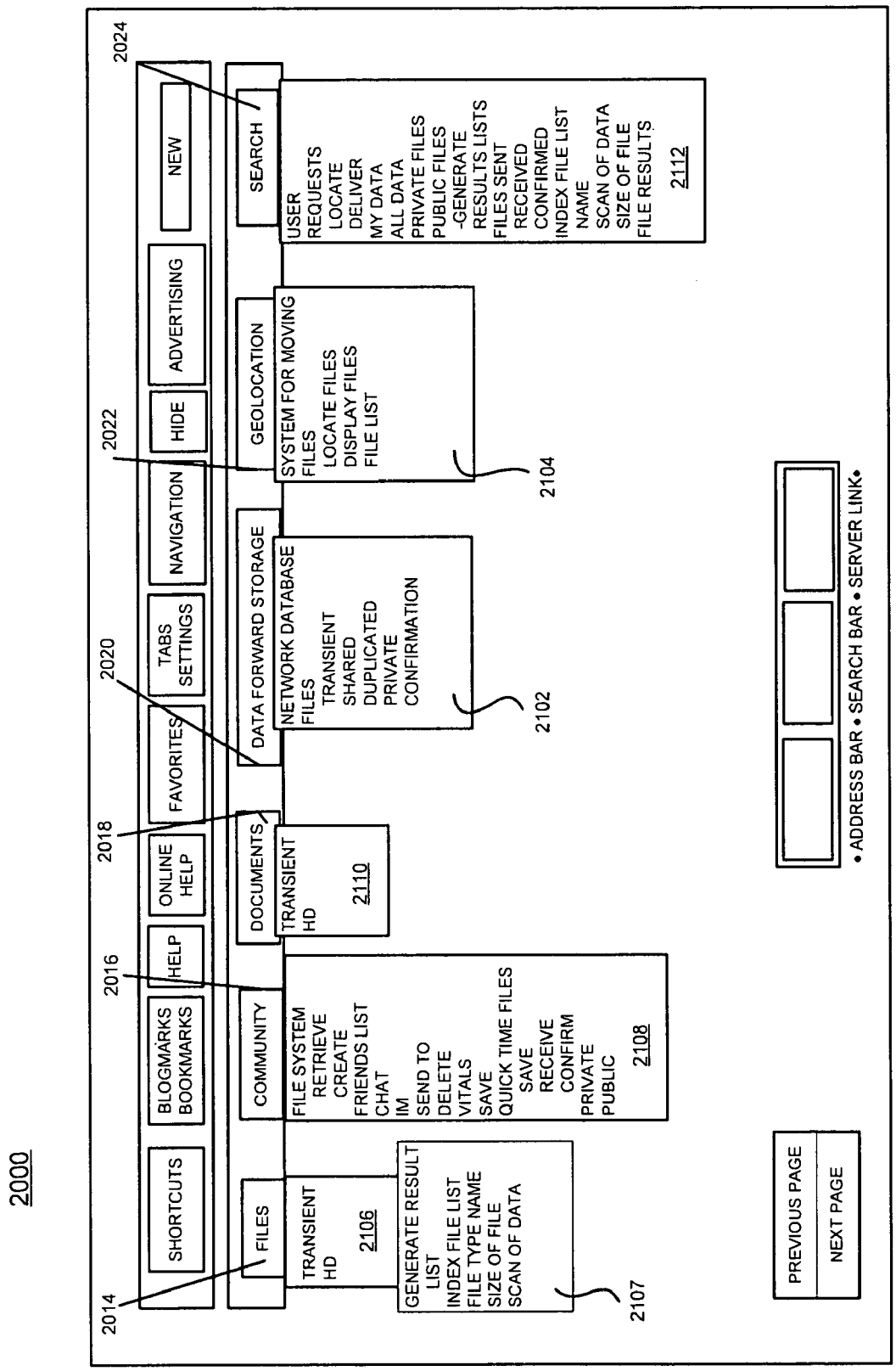

With reference to FIG. 20, data forward storage button 2020, when activated, opens sub-window 2102 on the same or a next page, depending on the embodiment. Sub-window 2102 provides several user options related to data storage in network 10. Of these options, "Transient" refers to files stored using data forward storage on network 10, "Shared" refers to files that permit access to one or more other users (e.g., other users 42 of network 10), "Duplicated" refers to files that are redundant or for which a copy may be made (e.g., using the redundant data storage functions described herein for network 10). One or more of these options may be selected for any given file or set of files (i.e., they are not mutually exclusive options).

Various other sub-windows 2104, 2106, 2108, 2110, and 2112 may also be displayed as their corresponding buttons 2014, 2016, 2018, 2022, and 2024 are selected. Files button 2014 opens sub-window 2106 to permit user 42 to obtain information on files stored in network 10 or on a local hard-drive or other local or networked fixed storage (indicated by "HD"). Once selecting one of these types of files, sub-window 2107 permits user 42 to create a list of files and obtain related file information. For example, user 42 may select "Index File List" to create a simple list of files. Documents button 2018 opens sub-window 2110 to permit user 42 to manage and interact with documents similarly as described for files button 2014. Community button 2016 opens sub-window 2108, which may provide options related to files associated with a community. Sub-window 2108 may permit interacting, for example, with the functions for real-time communications as described in this application. Sub-window 2108 may also permit accessing, sharing and discovering files from others in the community.

Geolocation button 2022 opens sub-window 2104 to permit user 42 to obtain information about the geographic location of user's 42 files (e.g., location of physical storage servers, or location of network systems in network 10 or particular networks through which data is being continuously forwarded). These geolocation options can be utilized by user 42 as a mapping tool to see where data is geographically being stored and/or forwarded in various networks used by and/or available for storage of data of user 42, including those using data forwarding storage. In other embodiments, geolocation button 2022 may open other sub-windows permitting user 42 to control one or more of the functions of geolocation in data forwarding storage as described below.

Search button 2024 opens sub-window 2112 to permit user 42 to perform various search functions on transient and/or HD type files.

Figure 21:
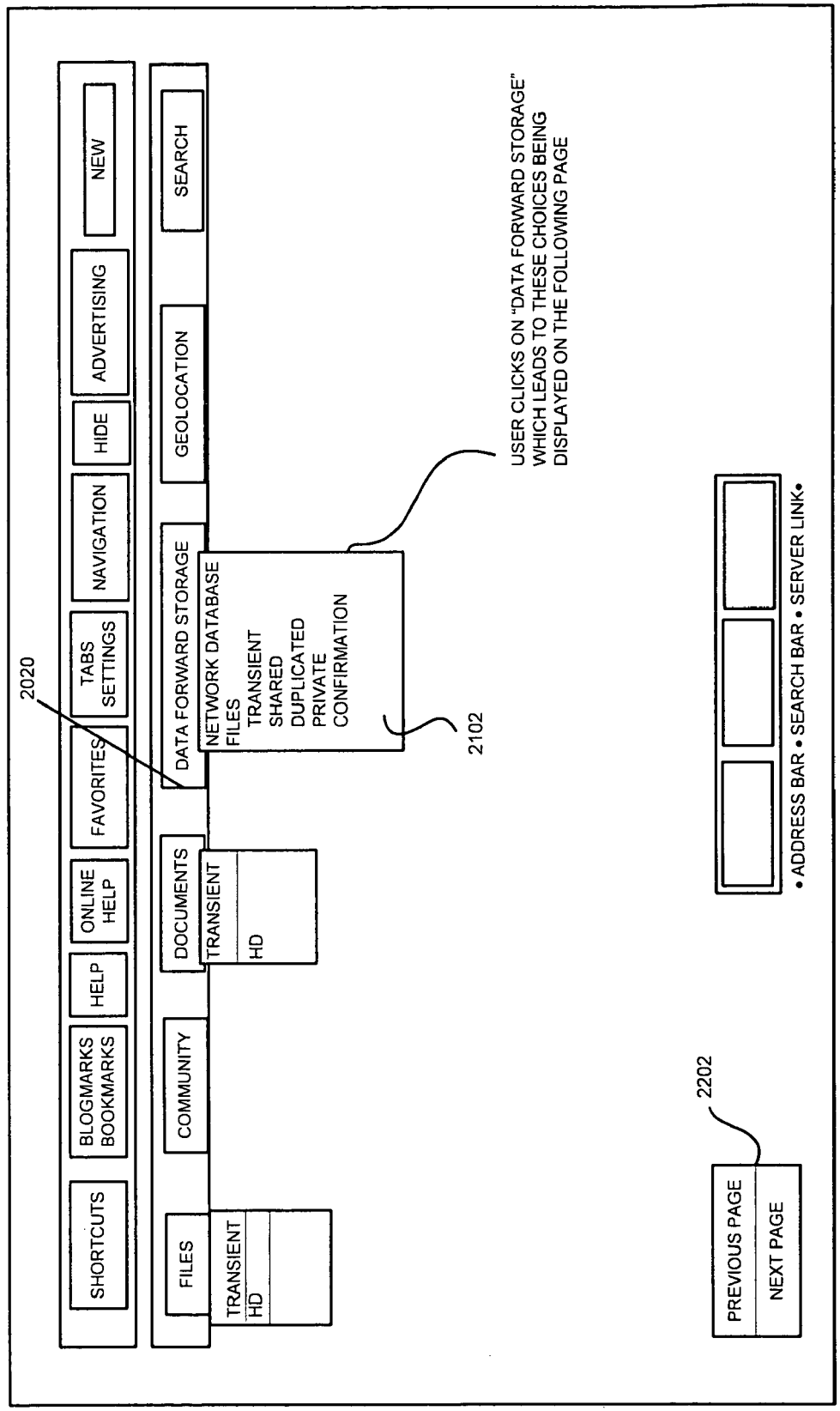

FIG. 21 illustrates that, after user 42 has selected or clicked on data forward storage button 2020, the choices of sub-window 2102 may be displayed as illustrated in a new page, for example, on I/O device 34. Page buttons 2202 permit user 42 to navigate backwards and forwards through pages of UI 2000.

Figure 22:
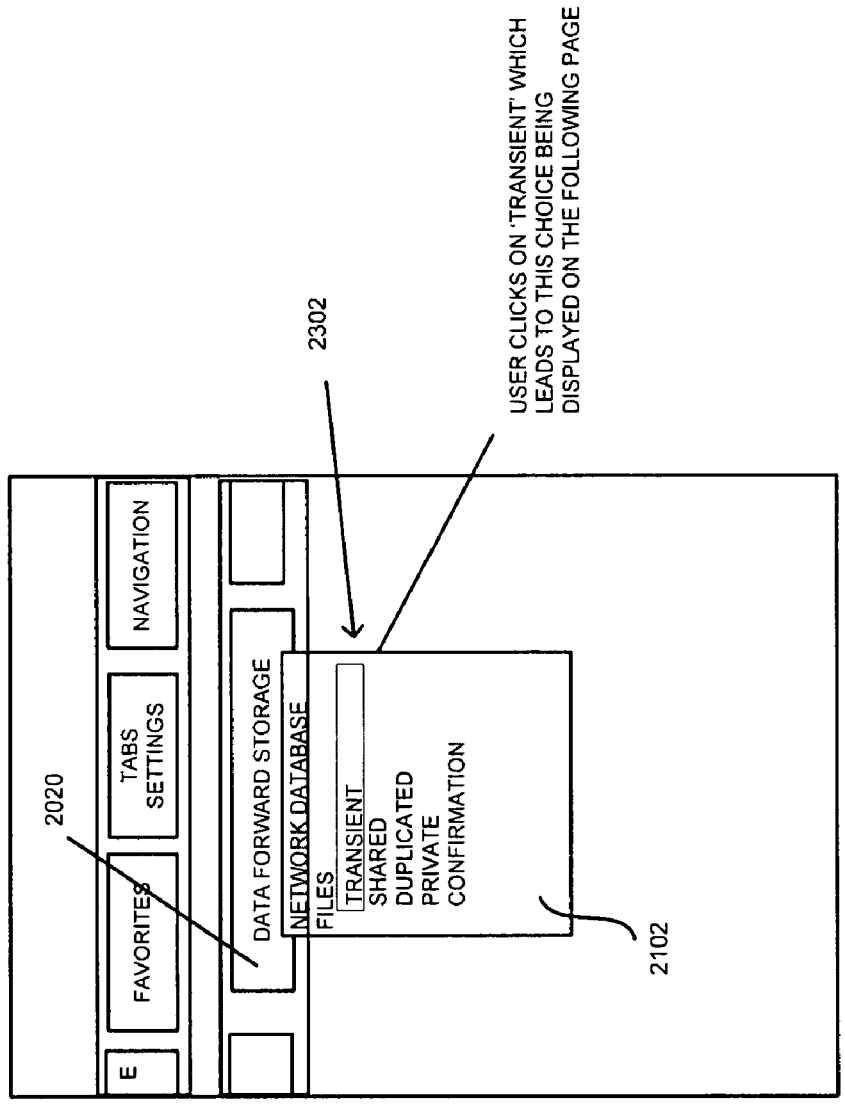

FIG. 22 illustrates the highlighting of "Transient" as it is selected from the menu options in sub-window 2102 by user 42. This may lead, for example, to the opening of a new page (see FIG. 23).

Figure 23:
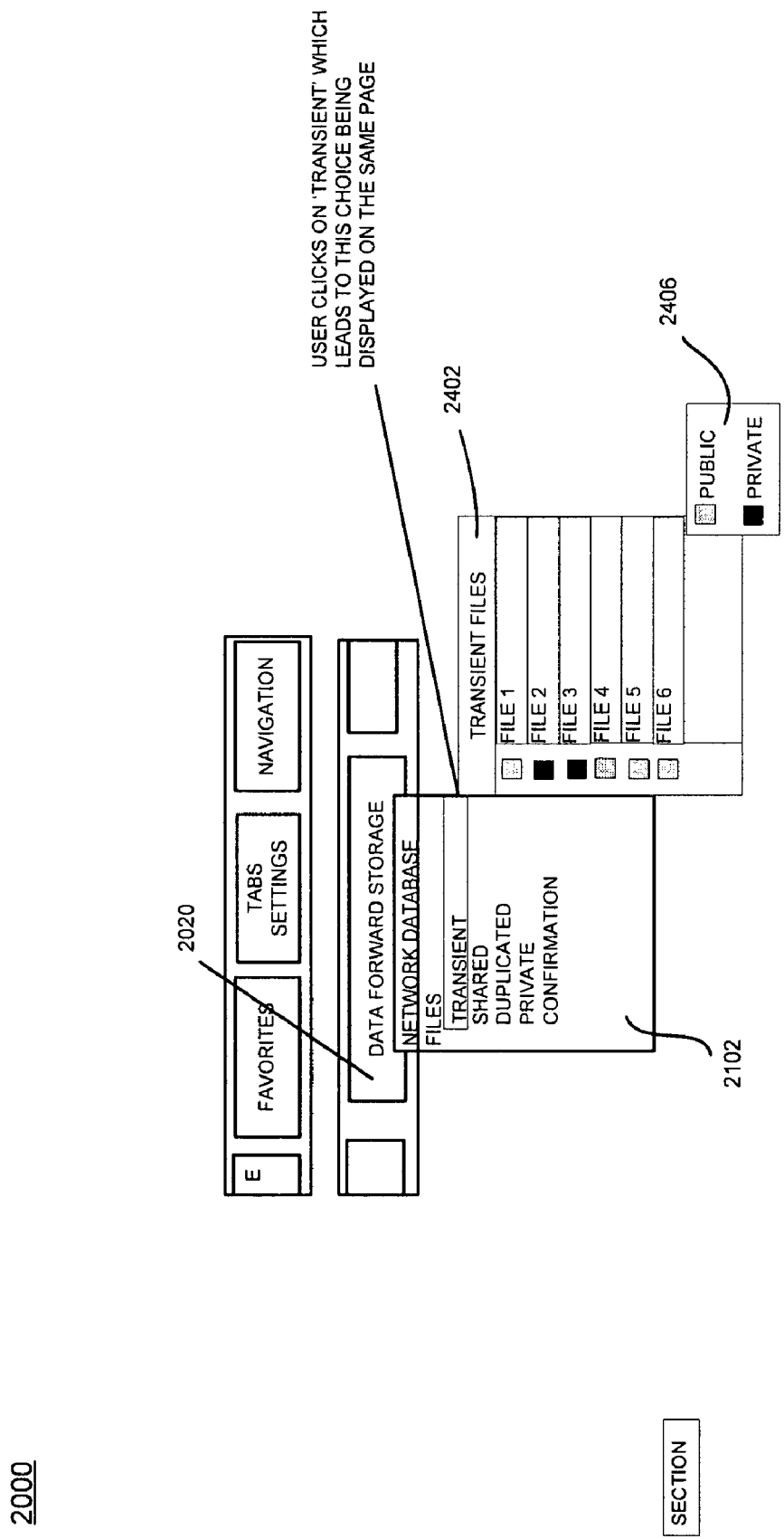

FIG. 23 illustrates the opening of sub-window 2402 after the selection of "Transient" as illustrated in FIG. 22. Sub-window 2402 displays a list of files stored within, for example, network 10 or otherwise using data forwarding storage, and provides an indication of the type of file (e.g., public or private). Legend 2406 may be provided to indicate the meaning or color-coding or other typing used for the displayed files. User 42 may use the displayed list of "Transient" files to determine the user's 42 files stored in one or more data forwarding storage networks or systems. User 42 is, for example, able to initiate an action on one or more of these files (e.g., by clicking on them to provide a default action, to select them for another action provided on the current page, or to open yet another sub-window to provide actions relevant for those particular displayed files.

User 42 is similarly presented with a list of files and the ability to take actions on one or more of the files as user 42 may navigate other menu bar/sub-window menu paths in UI 2000. Examples of actions that user 42 may initiate include open file, create backup of file, share file, etc. Within UI 2000, there may be more than one path or way to initiate the same particular action on a file.

Data File Forwarding and Search

In one embodiment, user interface 2000 may be used to interact with and control one or more functions of a data file forwarding and search embodiment, described further below.

In this embodiment, memory 52 can include a data file forwarding process 3200, a search process 3300, and a retrieval process 3400, described below. Network 10 may store, delete, search, and retrieve data files, as discussed below.

When a request to store a data file is received by central server 14 from storage process 100, the data file is directed to a node memory in network 10 where it is then continuously forwarded from node memory to node memory in the network 10 by the data file forwarding process 3200 in each of the network nodes without storing on any physical storage medium, such as a disk drive. The forwarded data file resides only for a very brief period of time in the memory of any one node in the network 10.

When a request to retrieve a data file is received by the central server 14 from storage process 100, the requested data file, which is being forwarded from node memory to node memory in the network 10, is retrieved.

Figure 7:
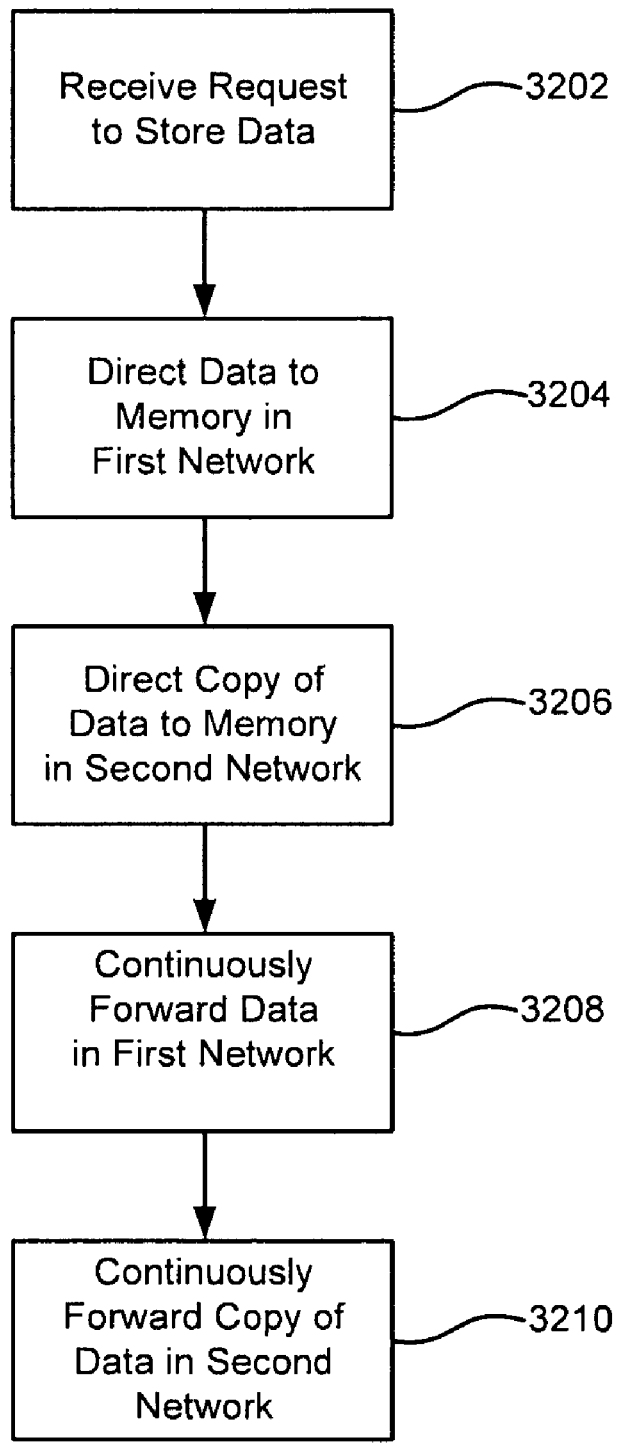
FIG. 7 is a flow diagram of a process.

As shown in FIG. 7, data file forwarding process 3200 includes receiving (3202) a request from a source system in a first network to store a data file.

Process 3200 directs (3204) the data file to a computer memory in a network. Process 3200 saves (3206) a file name of the data file, and in some implementations, a file type, a username and a date stamp, in an index file associated with the central server 14; the actual data contained in the data file is not stored on any physical medium. The index file is used to search for data files during the search process 3300, described below. Process 3200 scrambles (3208) a copy of the contents of the data file and saves (3210) the copied scrambled data in memory or on a physical storage device associated with the central server 14.

For example, assume a data file named "myfile.txt" includes the following text:

This is an example of data contained in an exemplary data file. The text herein is maintained as written in the data file and the data file continuously forwarded from node memory to node memory without storing on a physical medium.

Scrambling (3208) a copy of the above data file may, in one example, results in the following scrambled data:

> to without storing on a physical medium example node this contained exemplary herein file from maintained text data. and the in continuously is an of forwarded memory Only this scrambled data, indexed by file name, is saved to physical storage—no unscrambled data file is stored in any physical medium, such as a disk drive. Saving the copied scrambled data aids in maintaining security and in searching for data files being continuously forwarded.

Process 3200 continuously forwards (3212) the data file from the first computer memory to other computer memories in the network without storing on any physical storage device in the network. Continuously forwarding (3212) includes detecting a presence of the data file in memory of the specific node of the network and forwarding the data file to another computer memory of a node in the network of interconnected computer system nodes without storing any physical storage device.

Figure 8:
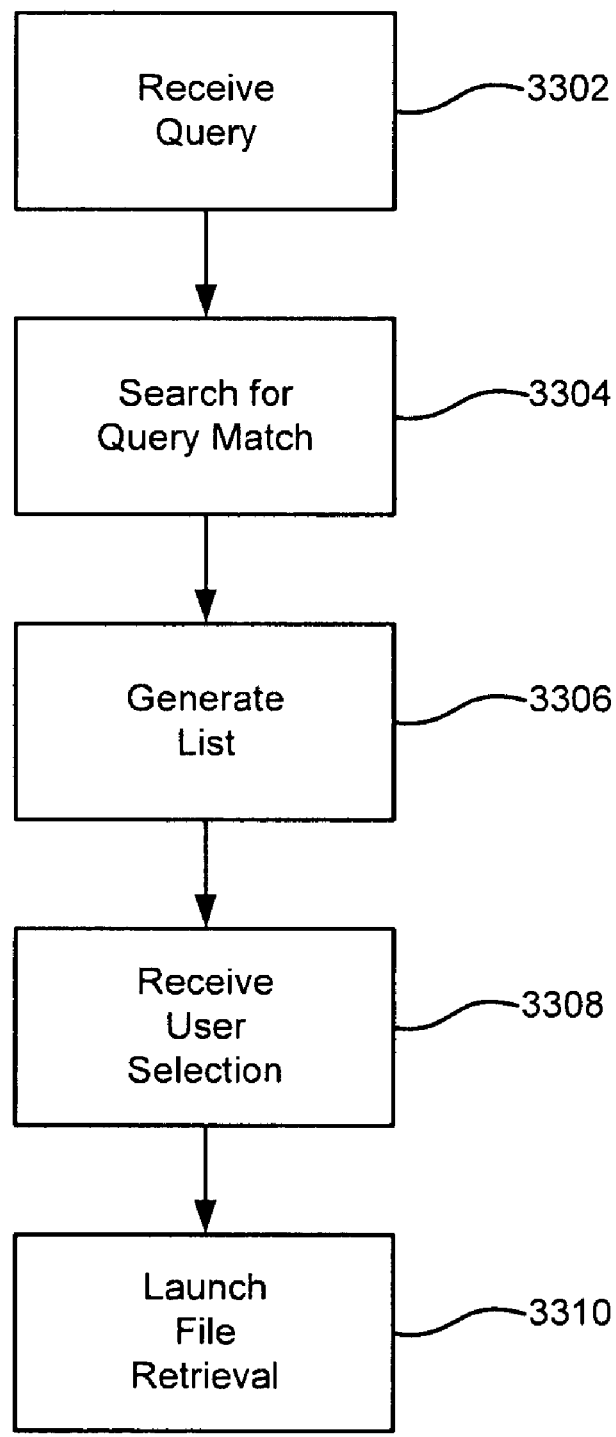
FIG. 8 is a flow diagram of a process.

As shown in FIG. 8, the search process 3300 includes receiving (3302) a query. Example queries include filenames, file types, usernames, dates and so forth. In one example, the query is a keyword or keywords. Search process 3300 searches (3304) the database of scrambled files represented by the index of file names for a match of the keyword or keywords. If a match of the keyword or keywords is found among the scrambled files, process 3300 generates (3306) a list of filenames containing the keyword or keywords. In one example, the list of file names is displayed to a user on an input/output device, enabling the user to select one of the file names. In another example, the list of filenames displayed includes supplemental information with respect to the file, such as, file type, file size, date saved and/or last modified, and so forth. Process 3300 receives (3308) a user selection of one of the filenames contained in the generated list of file names. The user selection can include a mouse click, a key board input, an audio input, and so forth, indicating a selected filename.

Process 3300 launches (3310) a file retrieval process 3400.

Figure 9:
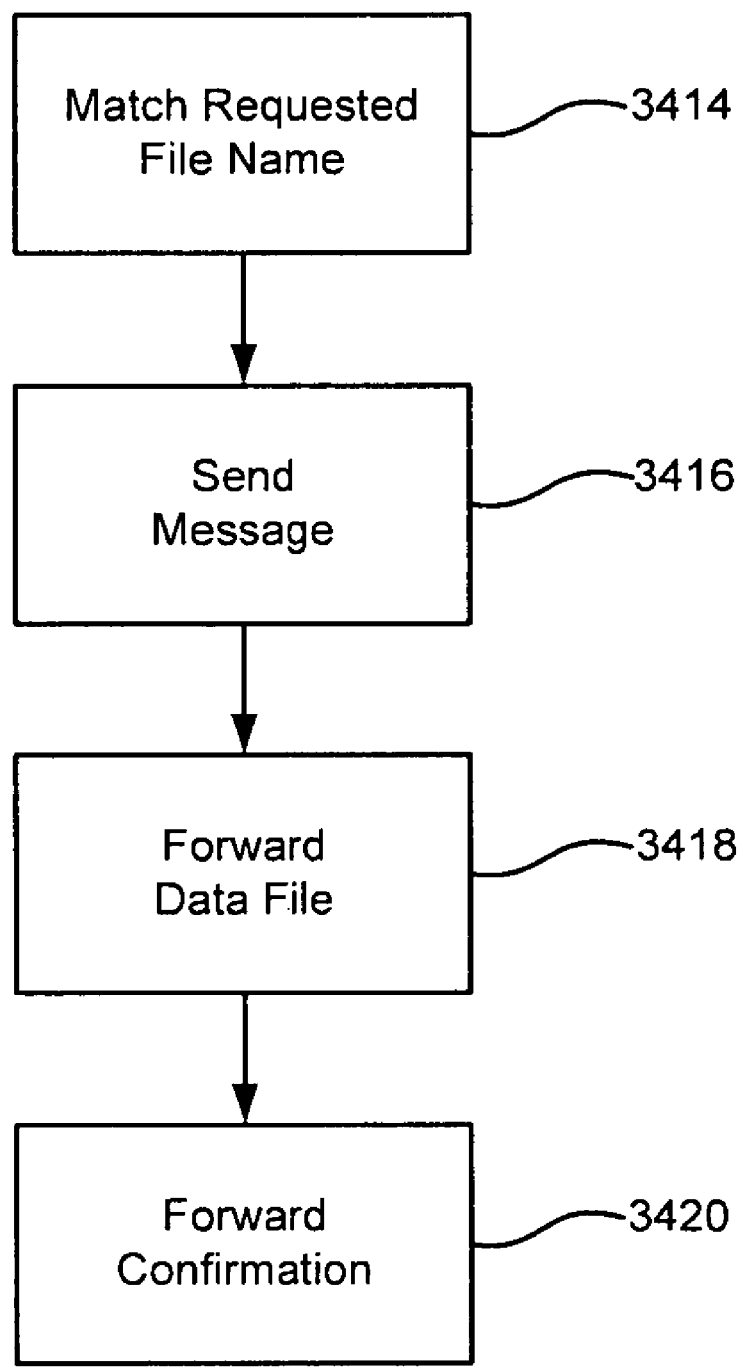
FIG. 9 is a flow diagram of a process.

As shown in FIG. 9, the file retrieval process 3400 matches (3414) the requested filename at the central server using a hash mark or other unique code that can be "sniffed" by the node upon the data entering the node via the encryption handshake. This can occur by pinging the nodes in the network. Process 3400 sends (3416) the message to return the data to the user directly to the node or node state where the central server believes the data will likely appear. The more the central server can narrow the node state that it pings to, then the more efficient the retrieval will become and the less burdened by unnecessary messaging traffic to nodes that are not necessary for a transaction between the central server and the node capable of forwarding the data.

Once the correct node receives the message to forward the data in node memory to the requester, process 3400 forwards (3418) in node memory the data to the requester and forwards (3420) a confirmation message that the data has been sent to the user. This routing message may be sent directly to the central server or may be passed to the central server or servers via other node(s) or supernode(s) in the network 10. Upon the user receiving the requested data the user's application functions to automatically ping the central server that the data requested has been received.

In another embodiment, storage process 100 only stores the scrambled data along with filename, and in some instances, file type, username, and/or date stamp, while automatically deleting the non-scrambled data file.

Redundant Data

In one embodiment, user interface 2000 may be used to interact with and control one or more functions of a redundant data system, described further below.

In one embodiment, network 10 may be used as a continuous redundant data forwarding system, i.e., data and copies of data are stored by continually forwarding it from one node memory to another node memory. Copies of data may be continuously forwarded in one or more networks.

When a request to store data is received by central server 14 from storage process 100, data is directed to a node in the network 10 where it is then continuously forwarded from node memory to node memory in the network 10 by the data forwarding process 3200 in each of the network nodes without storing on any physical storage medium such as a disk drive. The request to store data makes at least one copy of the data, which is directed to a node in a secondary private or public network, or directed to nodes on more than one network, where it too is continuously forwarded from node memory to node memory in the secondary private or public network. Data and copies of data are not stored on any physical storage medium in any network node.

When a request to retrieve data is received by the central server 14 from storage process 100, the requested data, which is being forwarded from node memory to node memory in the network 10, is retrieved.

As shown in FIG. 4, storage process 100 includes sending (102) a request to a central server 14 to store or retrieve data. If the request is a retrieve data request, storage process 100 receives the requested data from the central server 14 or node in the network. If the request to the central server 14 is a store data request, storage process 100 receives (104) first address of a node and a second address of a node from the central server 14 and forwards (106) the data to the node memory represented by the received first address and a copy of the data to the node memory represented by the received second address.

As shown in FIG. 7, data forwarding process 3200 includes receiving (3202) a request from a source system in a first network to store data.

Process 3200 directs (3204) the data to the first computer memory in a first network and directs (3206) a first copy of the data to a second computer memory in a second network. Directing (3206) may be to node memories in one or more networks, both private and/or public.

Process 3200 continuously forwards (3208) the data from the first computer memory to other computer memories in the first network without storing on any physical storage device in the first network.

Continuously forwarding (3208) includes detecting a presence of the data in memory of the specific node of the first network and forwarding the data to another computer memory of a node in the first network of interconnected computer system nodes without storing any physical storage device.

Process 3200 continuously forwards (3210) the first copy of the data from the second computer memory to other computer memories in the second network without storing on any physical storage device in the second network.

Continuously forwarding (3210) includes detecting a presence of the first copy of data in memory of the specific node of the second network, and forwarding the first copy of the data to another computer memory of a node in the second network of interconnected computer system nodes without storing any physical storage device.

Deletion of Data File

In one embodiment, user interface 2000 may be used to interact with and control one or more functions of a deletion of data file embodiment, described further below.

Figure 10:
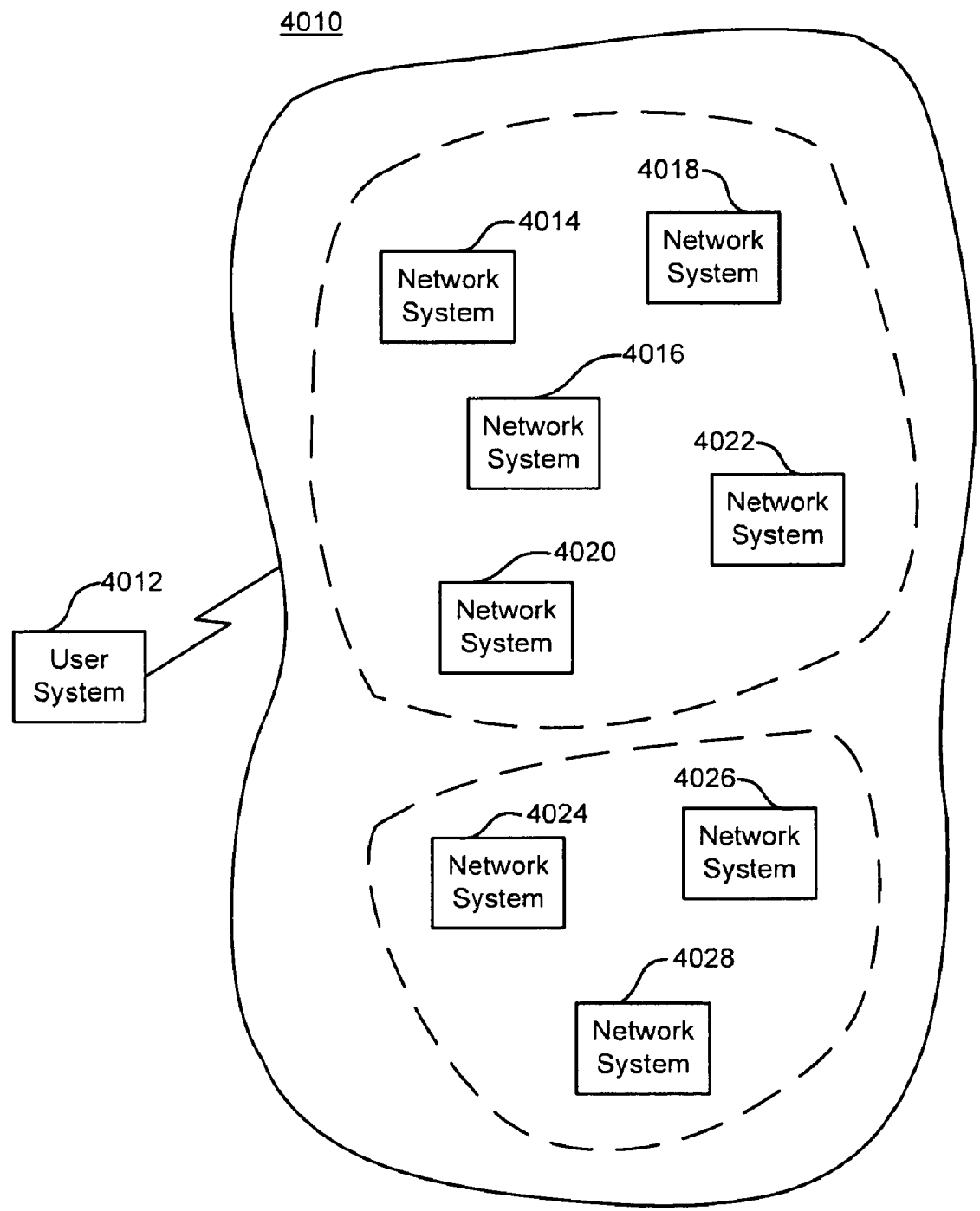
FIG. 10 is a block diagram of an exemplary framework.

In one embodiment, as shown in FIG. 10, an exemplary framework 4010 includes a user system 4012 and a number of network systems 4014, 4016, 4018, 4020, 4022. User system 4012 and network systems 4014, 4016, 4018, 4020, 4022 may generally use hardware as described for user system 12 and network systems 14, 16, 18, 20, and 22 of FIG. 1, discussed above.

Each of the network systems 4014, 4016, 4018, 4020, 4022 can be considered to be a node in the framework 4010 and one such network system may be designated as a central server, such as network system 4014, which may assume a control position in framework 4010. Each of the nodes 4014, 4016, 4018, 4020, 4022 may be established as a privately controlled network of peers under direct control of the central server 4014. Peered nodes may also be a mix of private and public nodes, and thus not under the direct physical control of the central server 4014. The framework 4010 may also be wholly public where the central server 4014 (or servers) has no direct ownership or direct physical control of any of the peered nodes.

In one example, nodes 4014, 4016, 4018, 4020 and 4022 are considered to be a private network. In a private network, an administrator controls the nodes and may designate which node is the central server. The framework 4010 can also include one or more additional nodes. For example, nodes 4024, 4026 and 4028. These nodes 4024, 4026 and 4028 are considered to be part of one or more public networks in which the administrator has little or no control.

Memory 32 may be used in user system 4012 and can include a storage process 4100. Memory 52 may be used in each of the network systems 4014, 4016, 4018, 4020, 4022 and can include a data file forwarding process 4200, a search process 4300, and a retrieval process 4400, described below.

One network system, such as network system 4022, is designated as a deletion node, more fully described below. Memory of the deletion node 4022 does not include a data file forwarding process 4200, search process 4300, and retrieval process 4400. Any data file received by the deletion node is not forwarded or saved. New data received in the memory of the deletion node overwrites old data received by the memory of the deletion node. In effect, the deletion node 4022 acts as a black hole for data files forwarded to it.

In this section, the terms "data file" are used to represent all file and media types handled by the system, such as, for example, files for data, program files, audio files, video files, picture files, and so forth. Data files being forwarded in framework 4010 can be deleted and thus no longer forwarded from node memory to node memory.

Figure 11:
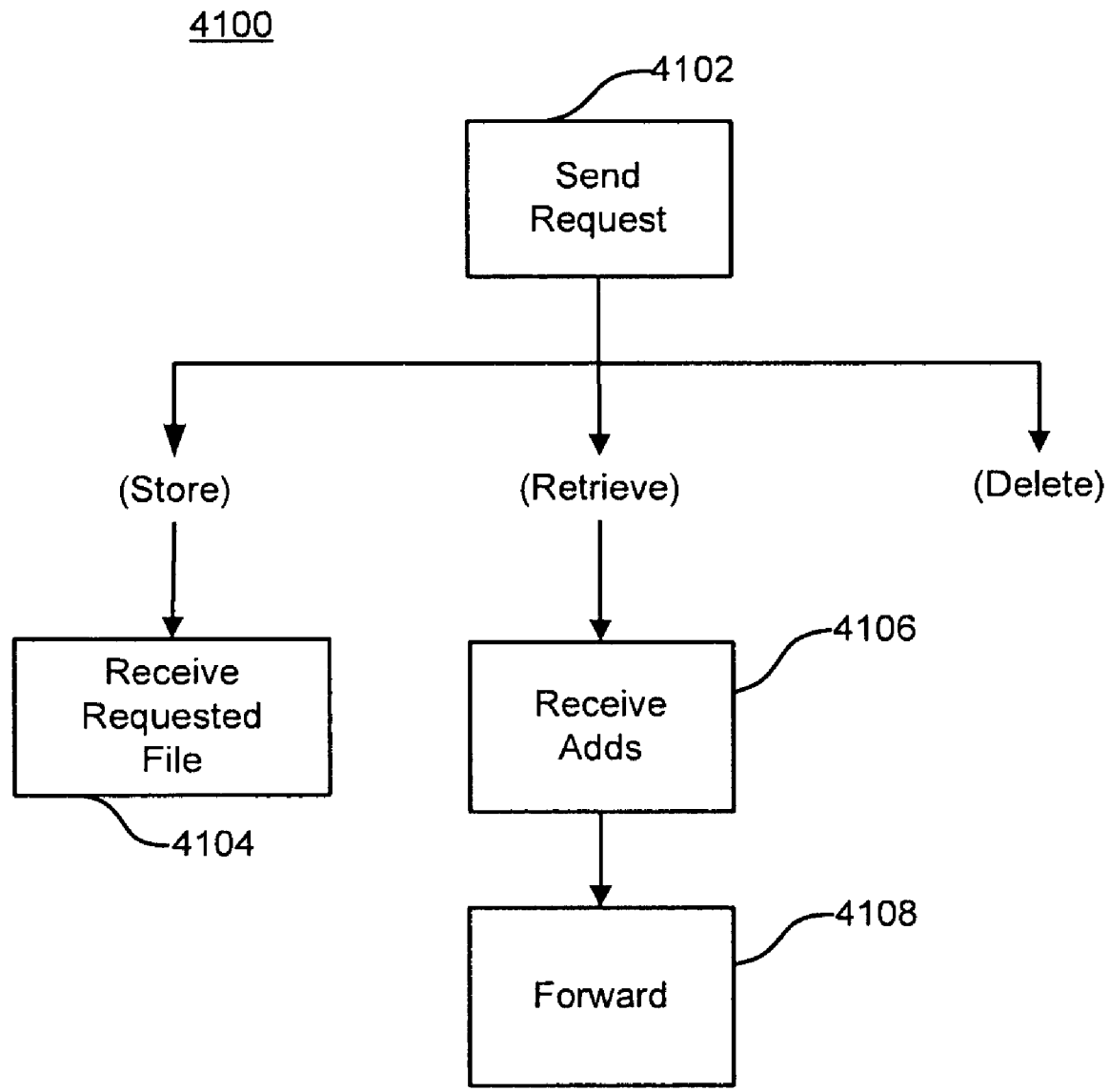
FIG. 11 is a flow diagram of a process.

In one embodiment, as shown in FIG. 11, storage process 4100 includes sending (4102) a request to a central server 4014 to store, retrieve or delete a data file. If the request is a retrieve data file request, storage process 4100 receives (4104) the requested data file from the central server 4014 or node in the network.

If the request to the central server 4014 is a store data file request, storage process 4100 receives (4106) an address of a node from the central server 4014 and forwards (4108) the data file to the node memory represented by the received address.

Figure 12:
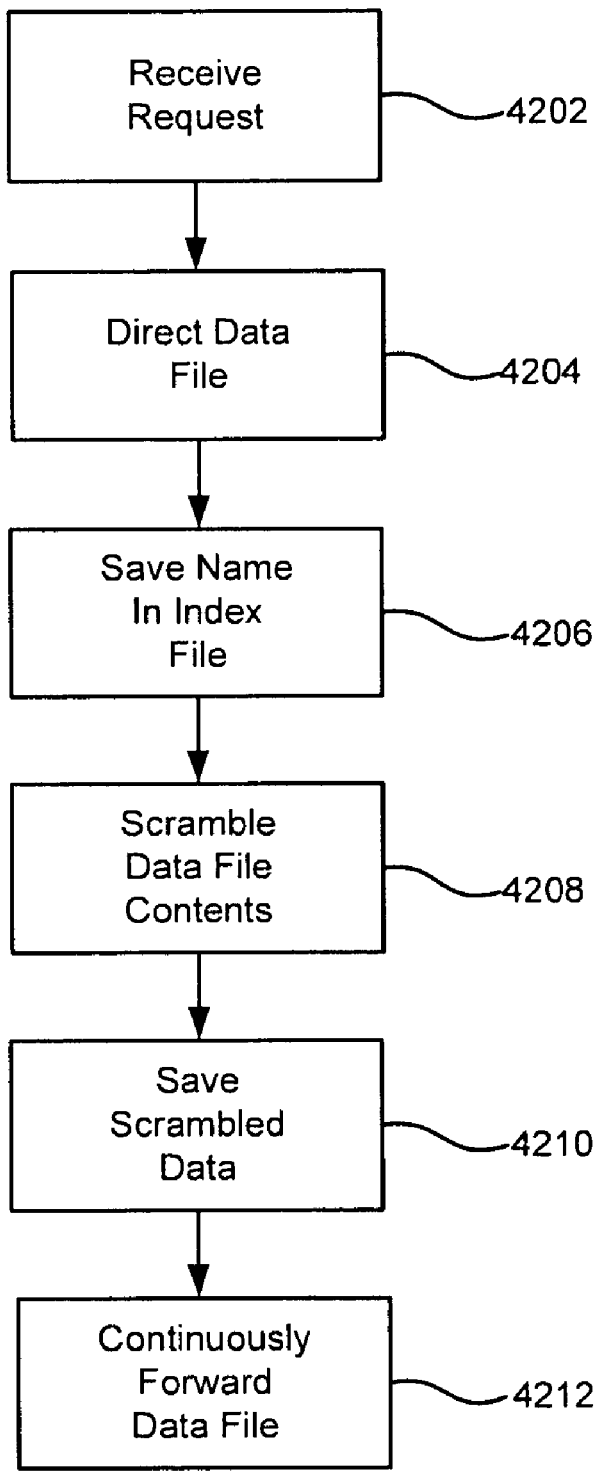
FIG. 12 is a flow diagram of a process.

As shown in FIG. 12, data file forwarding process 4200 includes receiving (4202) a request from a source system in a network to store a data file.

Process 4200 directs (4204) the data file to a computer memory in a network. Process 4200 saves (4206) a file name of the data file, and in some implementations, a file type, a username and a date stamp, in an index file associated with the central server 4014; the actual data contained in the data file is not stored on any physical medium. The index file is used to search for data files during the search process 4300, described more fully below. Process 4200 scrambles (4208) a copy of the contents of the data file and saves (4210) the copied scrambled data in memory or on a physical storage device associated with the central server 4014.

For example, assume a data file named "myfile.txt" includes the following text:

This is an example of data contained in an exemplary data file. The text herein is maintained as written in the data file and the data file continuously forwarded from node memory to node memory without storing on a physical medium.

Scrambling (4208) a copy of the above data file may, in one example, results in the following scrambled data:

to without storing on a physical medium example node this contained exemplary herein file from maintained text data. and the in continuously is an of forwarded memory Only this scrambled data, indexed by file name, is saved to physical storage—no unscrambled data file is stored in any physical medium, such as a disk drive. Saving the copied scrambled data aids in maintaining security and in searching for data files being continuously forwarded.

Process 4200 continuously forwards (4212) the data file from the first computer memory to other computer memories in the network without storing on any physical storage device in the network. Continuously forwarding (4212) includes detecting a presence of the data file in memory of the specific node of the network and forwarding the data file to another computer memory of a node in the network of interconnected computer system nodes without storing any physical storage device.

Figure 13:
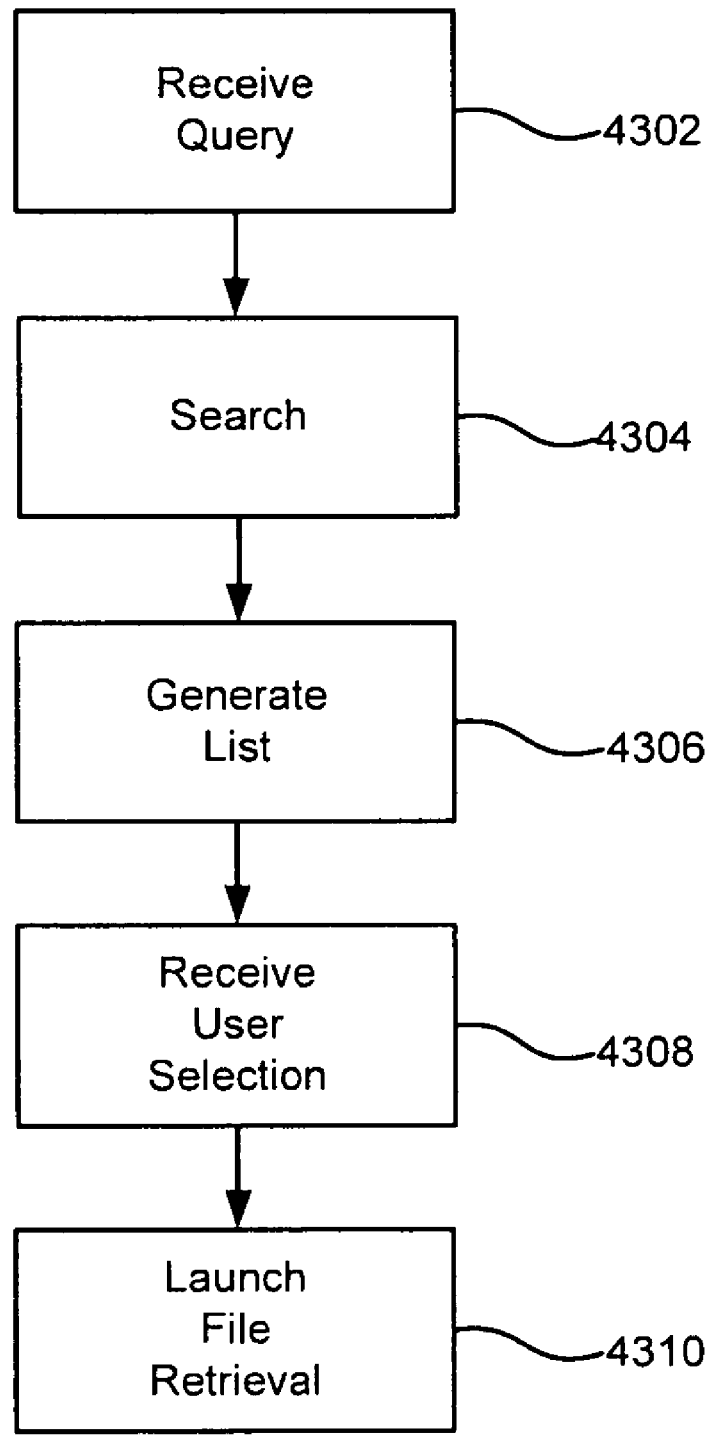
FIG. 13 is a flow diagram of a process.

As shown in FIG. 13, the search process 4300 includes receiving (4302) a query. Example queries include filenames, file types, usernames, dates and so forth. In one example, the query is a keyword or keywords. Search process 4300 searches (4304) the database of scrambled files represented by the index of file names for a match of the keyword or keywords. If a match of the keyword or keywords is found among the scrambled files, process 4300 generates (4306) a list of filenames containing the keyword or keywords. In one example, the list of file names is displayed to a user on an input/output device, enabling the user to select one of the file names. In another example, the list of filenames displayed includes supplemental information with respect to the file, such as, file type, file size, date saved and/or last modified, and so forth. Process 4300 receives (4308) a user selection of one of the filenames contained in the generated list of file names. The user selection can include a mouse click, a key board input, an audio input, and so forth, indicating a selected filename.

Process 4300 launches (4310) a file retrieval process 4400.

Figure 14:
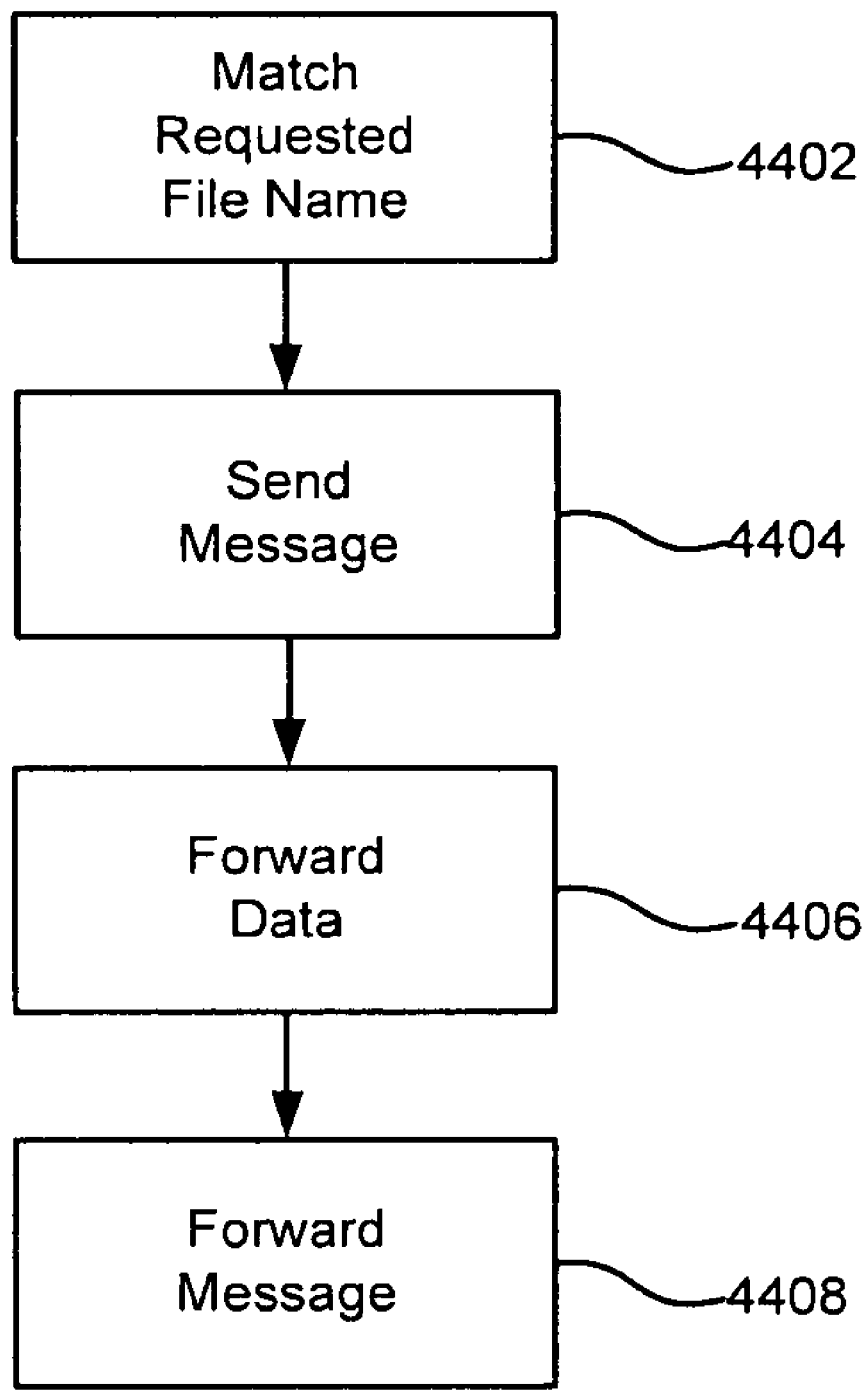
FIG. 14 is a flow diagram of a process.

As shown in FIG. 14, the file retrieval process 4400 matches (4402) the requested filename at the central server using a hash mark or other unique code that can be "sniffed" by the node upon the data entering the node via the encryption handshake. This can occur by pinging the nodes in the network. Process 4400 sends (4404) the message to return the data to the user directly to the node or node state where the central server believes the data will likely appear. The more the central server can narrow the node state that it pings to, then the more efficient the retrieval will become and the less burdened by unnecessary messaging traffic to nodes that are not necessary for a transaction between the central server and the node capable of forwarding the data.

Once the correct node receives the message to forward the data in node memory to the requester, process 4400 forwards (4406) in node memory the data to the requester and forwards (4408) a confirmation message that the data has been sent to the user. This routing message may be sent directly to the central server or may be passed to the central server or servers via other node(s) or supernode(s) in the framework 4010. Upon the user receiving the requested data the user's application functions to automatically ping the central server that the data requested has been received. Thus, the framework 4010 creates data storage without caching, downloading and/or storing the data on any physical storage medium. Data storage and management is accomplished via a continuous routing of the data from node memory to node memory.

In another embodiment, storage process 4100 only stores the scrambled data along with filename, and in some instances, file type, username, and/or date stamp, while automatically deleting the non-scrambled data file.

If the request to the central server 4014 is a delete data file request, the central server 4014 launches a file deletion process 4500.

Figure 15:
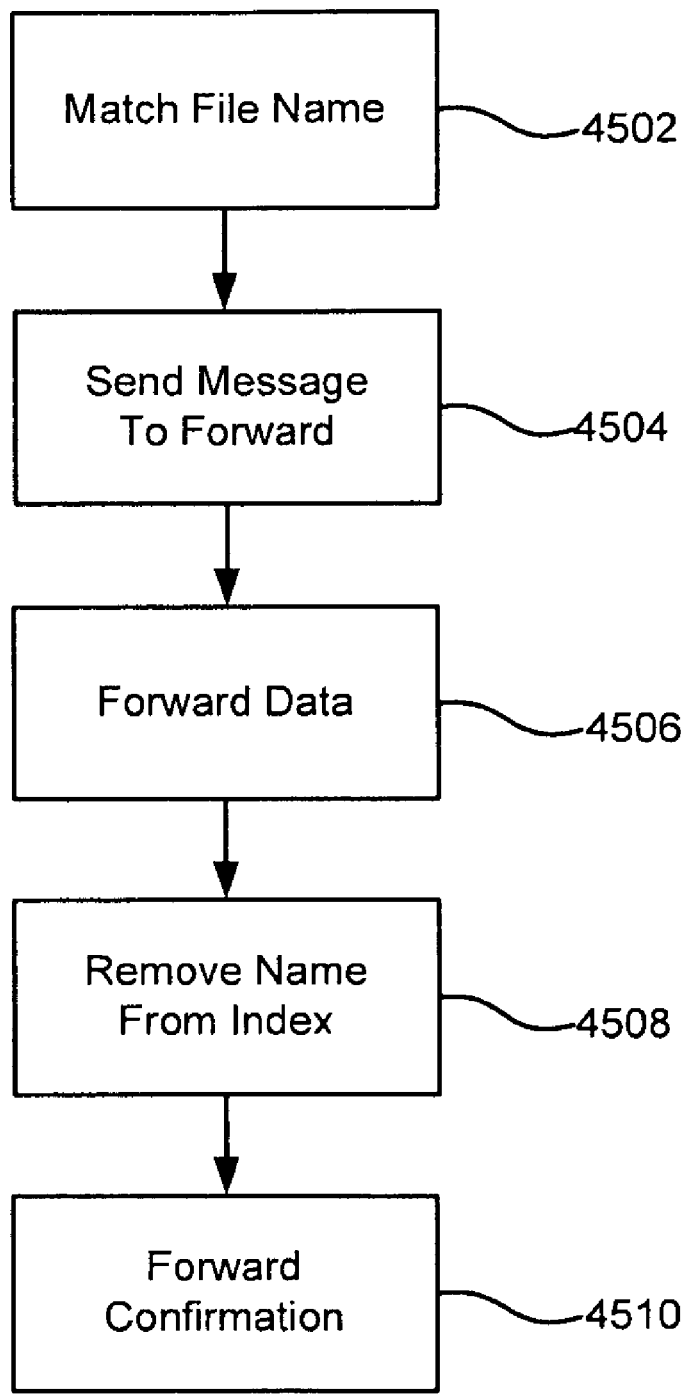
FIG. 15 is a flow diagram of a process.

As shown in FIG. 15, process 4500 matches (4502) the filename to delete at the central server 4014 using a hash mark or other unique code that can be "sniffed" by the node upon the data entering the node via the encryption handshake. This can occur by pinging the nodes in the network. Process 4500 sends (4504) the message to forward the data to the deletion node 4028 directly to the node or node state where the central server believes the data will likely appear.

Process 4500 forwards (4506) in node memory the data to the deletion node. Process 4500 removes (4508) the data file name from the index and forwards (4510) a confirmation message that the data has been deleted to the user. This routing message may be sent directly to the central server or may be passed to the central server or servers via other node(s) or supernode(s) in the framework 4010.

The framework 4010 creates data storage without caching, downloading and/or storing the data on any physical storage medium. Data storage and management is accomplished via a continuous routing of the data from node memory to node memory, the forwarded data only downloaded when the user requests the data to be returned to the user from the framework 4010.

Advertisement Forwarding Storage and Retrieval

In one embodiment, user interface 2000 may be used to interact with and control one or more functions of an advertisement storage and retrieval embodiment, discussed in more detail below.

The data forwarding storage and management system in which the data is never fixed in physical storage, but in fact, is continually being routed/forwarded from node memory to node memory in the network, can be used as a backend system(s) in many applications that currently used fixed medium storage. In one example, this data forwarding storage and management system where the data is continually being routed/forwarded from node memory to node memory in the network is used as an advertisement forwarding and retrieval system. Advertisement is deployed into the data forwarding storage and management system from a master server or control station and recalled on demand or in response to a stimulus or activity.

Here, we consider advertisement as a broad term that can include any content, including, but limited to, text, audio, visual or any combination thereof. Advertisement can be deployed into the data forwarding storage network and recalled/retrieved when needed, e.g., directed to an IP address of a specific user system, directed to paid and/or unpaid subscribers of applications within the data forwarding storage network, and/or directed to users outside of the data forwarding storage network. Advertisement being continuously forwarded in the data forwarding storage network can be sent to all users or specifically targeted according to one or more user characteristics, user profiles, usage patterns, history and/or past or present viewed page content. The advertisement being continuously forwarded in the data forwarding storage network can be displayed to a current user within an application or web browser or delivered to a wired or wireless radio, television and/or television network.

Advertisements can be retrieved in response to a stimulus or activity, such as the user's profile, traffic patterns of one or more users, application profiles, and so forth. Advertisements can be stored and delivered in any media form and either pre-configured by specific file type and size for a specific end user or site delivery requirements/formats, or delivered and formatted by virtue of the end user or middleware software compatibility systems.

In one example, selected advertisement can be delivered to a user through a web browser. More particularly, a plug-in and/or helper application can be associated with a user's web browser. In general, a plug-in is a computer program that interacts with a host application (a web browser or an email client, for example) to provide a certain, usually very specific, function "on demand." As a user navigates to a particular web page, the plug-in can parse displayed text. The plug-in can then request specific advertisement being continuously forwarded in the data forwarding storage network that matches the parsed text to the web browser of the user for display in a section of the display screen or as a pop-up.

In another example, a user requesting retrieval of a data file being continuously forwarded in the data forwarding storage network may be presented with specific advertisement being continuously forwarded in the data forwarding storage network that matches the user's profile. The user's profile may include various personal and/or demographic data that aids in directing appropriate advertisement to the user. The advertisement may then be displayed as a banner or in a shared window or in a separate window.

In each of the examples above, the network includes a group of interconnected computer system nodes each adapted to receive data and advertisement and continuously forward the data and advertisement from computer memory to computer memory, independent of each other, without storing on any physical storage device, in response to a request to store the data from a requesting system and retrieve data being continuously forwarded from computer memory to computer memory in response to a request to retrieve the data from the requesting system. Each node in the network is adapted to detect the presence of a data and advertisement in its memory and forward the data and advertisement to a computer memory of another node in the interconnected computer systems nodes according to a node's availability. The node's availability can be determined according to its volume of network traffic. Each node can encrypt the data.

A central node can be adapted to match the data retrieval request at a central server using a hash mark representing the data or advertisement entering a node, send a message to a node that is predicted to have the data or advertisement in memory, the message instructing the node to forward the data and/or advertisement in memory to the requester, and send a confirmation message to the central server that the data or advertisement in memory has been forwarded to the requester.

Figure 6:
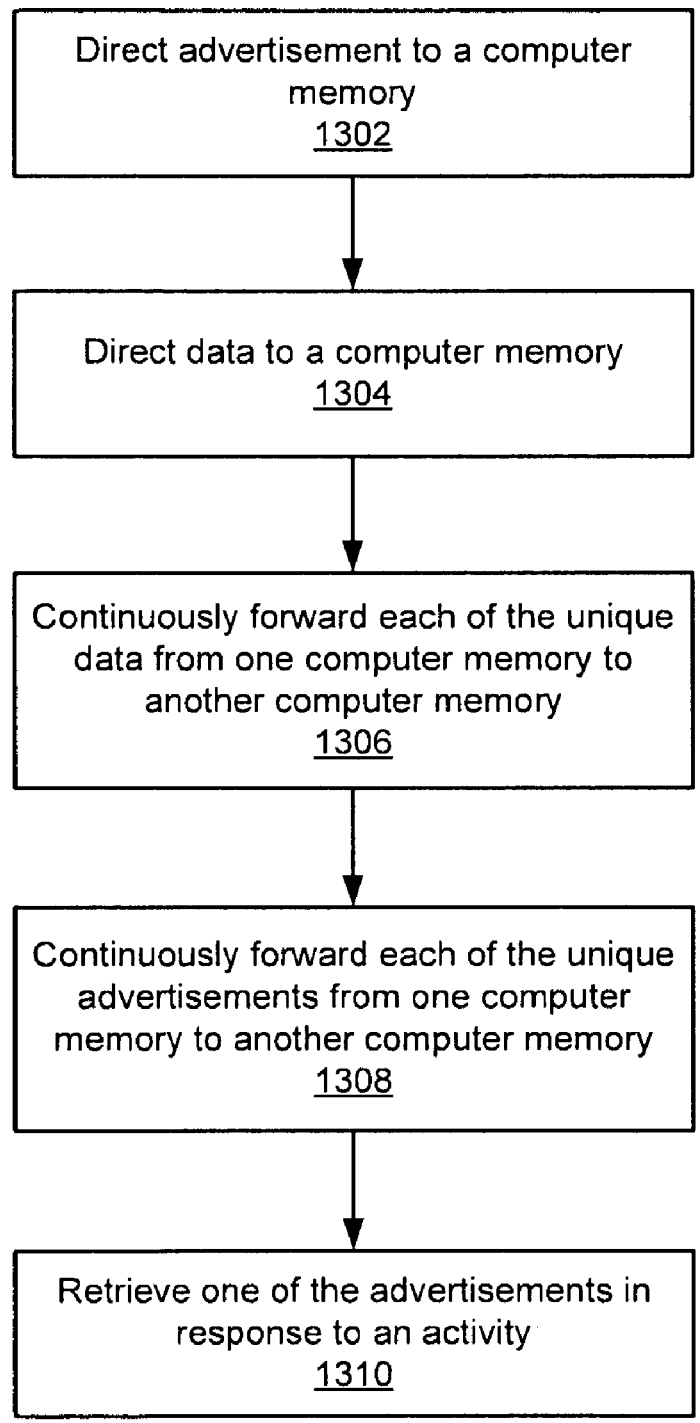
FIG. 6 is a flow diagram of a process.

As shown in FIG. 6, a process 1300 includes directing (1302) advertisement to a computer memory. The advertisement can include any content, including, but not limited to, text, audio, visual or any combination thereof. The advertisement can include multiple configurations in order to satisfy different systems delivery specifications. Advertisements can be stored and delivered in any media form and either pre-configured by specific file type and size for a specific end user or site delivery requirements/formats, or delivered and formatted by virtue of the end user or middleware software compatibility systems.

Process 1300 directs (1304) data to a computer memory.

Process 1300 continuously forwards (1306) each of the unique data, independent of each other, from one computer memory to another computer memory in the network of interconnected computer system nodes without storing on any physical storage device in the network.

Process 1300 continuously forwards (1308) each of the unique advertisements, independent of each other, from one computer memory to another computer memory in the network of interconnected computer system nodes without storing on any physical storage device in the network.

Process 1300 retrieves (1310) one of the advertisements in response to an activity.

Media Delivery

In one embodiment, user interface 2000 may be used to interact with and control one or more functions of a media delivery embodiment, discussed in more detail below.

The data storage and management system in which the data is never fixed in physical storage, but in fact, is continually being routed/forwarded from node memory to node memory in the network, can be used as a backend system(s) in many applications that currently used fixed medium storage. In one example, this data storage and management system where the data is continually being routed/forwarded from node memory to node memory in the network is used in a media delivery system. Here, we consider media to broadly include any predictable content, any archival content, any audio content, visual content, any text-based content, and so forth. Predictable content can be deployed into the data forwarding storage network and recalled/retrieved when needed, e.g., directed to an IP address of a specific user system.

The content can include text, audio, visual images, audio-visual images, or any combination thereof. For example, the network can continuously forward certain audiovisual highlights that are used each day, such as program introductions, graphic packages, introduction and theme music, historical footage of significance, commonly used reference footage, and so forth.

This content being continuously forwarded in the network may or may not be needed in the future. More specifically, content that is most likely needed but are seeded into the network according to the probability of use, not based upon the individual needs of a user to store a file. In addition to using probability of need as a storage priority, the network can use a more diverse distribution list for the stored content than the forward storage system utilized by a user for "normal file storage" because users are delivered material not by calling/requesting a file from the network itself, but by virtue of a content provider using the network as a distribution tool to their audience.

One such example is a stock quote system. In traditional stock quote systems used on the World Wide Web ("Web"), a user accesses a stock quote website through a graphical user interface (GUI) used for web browsing, such as Firefox®, Opera® or Flock®. One example stock quote website is Yahoo!® financial. The user enters a trading symbol of a stock in which he/she wants to query. The stock quote website receives the stock symbol, sends the stock symbol to a stock quote backend for a current price, receives the current price from the stock quote backend, and sends the current price to the user's GUI for viewing by the user. The current price is a numerical value, such as 17½, in this example.

Numeric values can be deployed into the data storage and management system and continually routed/forwarded from node memory to node memory in the network. A range of numeric values in appropriate increments can be deployed in the data storage and management system, similar to how data files are deployed when a message to store is received. Each of the numeric values is sent from a user system to the central server 14 using the data forwarding process 200, fully described above. This results in a large number of distinct and unique numeric values continually being routed/forwarded from node memory to node memory in the network.

When a user requests a current stock price from a web application like Yahoo! financial, Yahoo! financial requests from the backend stock quote server a current price and the central server 14 is informed of this price directly from the back end stock quote server. The central server 14 requests the numeric value representing the received price from the network and once found, directs the numeric value to the Internet Protocol (IP) address of the user requesting the quote.

In another stock quote example, a range of numeric values embedded in text can be deployed into the data storage and management system where the they are continually being routed/forwarded from node memory to node memory in the network. For example, "IBM is selling at 25," "IBM is selling at 25⅛," and forth, can be deployed. When a result for the current price of IBM is received, the financial web site requests from the backend stock quote server a current price and the central server 14 is informed of this price directly from the back end stock quote server. The central server 14 requests the numeric value representing the received price, along with associated text, from the network and once found, directs the numeric value with associated text to the Internet Protocol (IP) address of the user requesting the price. For example, if the current price of IBM sock is 25, the central server 14 requests that "IBM is selling at 25" be delivered to the user requesting the quote.

The above specific example used a range of unique numeric values in appropriate increments deployed in our data storage and management system. However, any predictable content, archival data and/or media data can be deployed in our data storage and management system. For example, election results can be deployed into our data storage and management system. More specifically, a news item reporting "Senator Obama won the general election" and that "Senator McCain won the general election" can be deployed to the network where they are never fixed in physical storage, but in fact, continually being routed/forwarded from node memory to node memory in the network.

When the election results are known in November 2008, a user can request election results. The web application makes a request to a news service requesting election results from a web application having a back end supported by our data storage and management system. The central server 14 is informed of election results by a news server. The central server 14 locates the news item in the network and directs the news story to the Internet Protocol (IP) address of the user requesting the news information.

In each of the examples above, the network includes a group of interconnected computer system nodes each adapted to receive data items and continuously forward the data items from computer memory to computer memory, independent of each other, without storing on any physical storage device, in response to a request to store the data items from a requesting system and retrieve a particular data item being continuously forwarded from computer memory to computer memory in response to a request to retrieve the data item from the requesting system. Each node in the network is adapted to detect the presence of a data item in its memory and forward the data item to a computer memory of another node in the interconnected computer systems nodes according to a node's availability. The node's availability can be determined according to its volume of network traffic. Each node can encrypt the data item.

A central node can be adapted to match the data retrieval request at a central server using a hash mark representing the data item entering a node, send a message to a node that is predicted to have the data item in memory, the message instructing the node to forward the data item in memory to the requester, and send a confirmation message to the central server that the data item in memory has been forwarded to the requester.

Real-Time Communications

Instant Messaging (IM) is a form of real-time communication between two or more people based on typed text. The text is conveyed using computers connected over a network such as the Internet. IM enables instantaneous communication between a number of parties simultaneously, by transmitting information quickly. Some IM systems enable users to use webcams and microphones for real-time conversations. In addition IM has additional features such as the immediate receipt of acknowledgment or reply, group chatting, conference services (including voice and video), conversation logging and file transfer. For example, it is possible to save a conversation for later reference. Instant messages are typically logged in a local message history that closes the gap to the persistent nature of E-mails and facilitates quick exchange of information like universal resource locators (URLs) or document snippets (which can be unwieldy when communicated via telephone).

In one embodiment, user interface 2000 may be used to interact with and control one or more functions in a real-time communications (e.g., social networking applications such as instant messaging) embodiment used in a continuously data forwarding network, as described further below.

Figure 16:
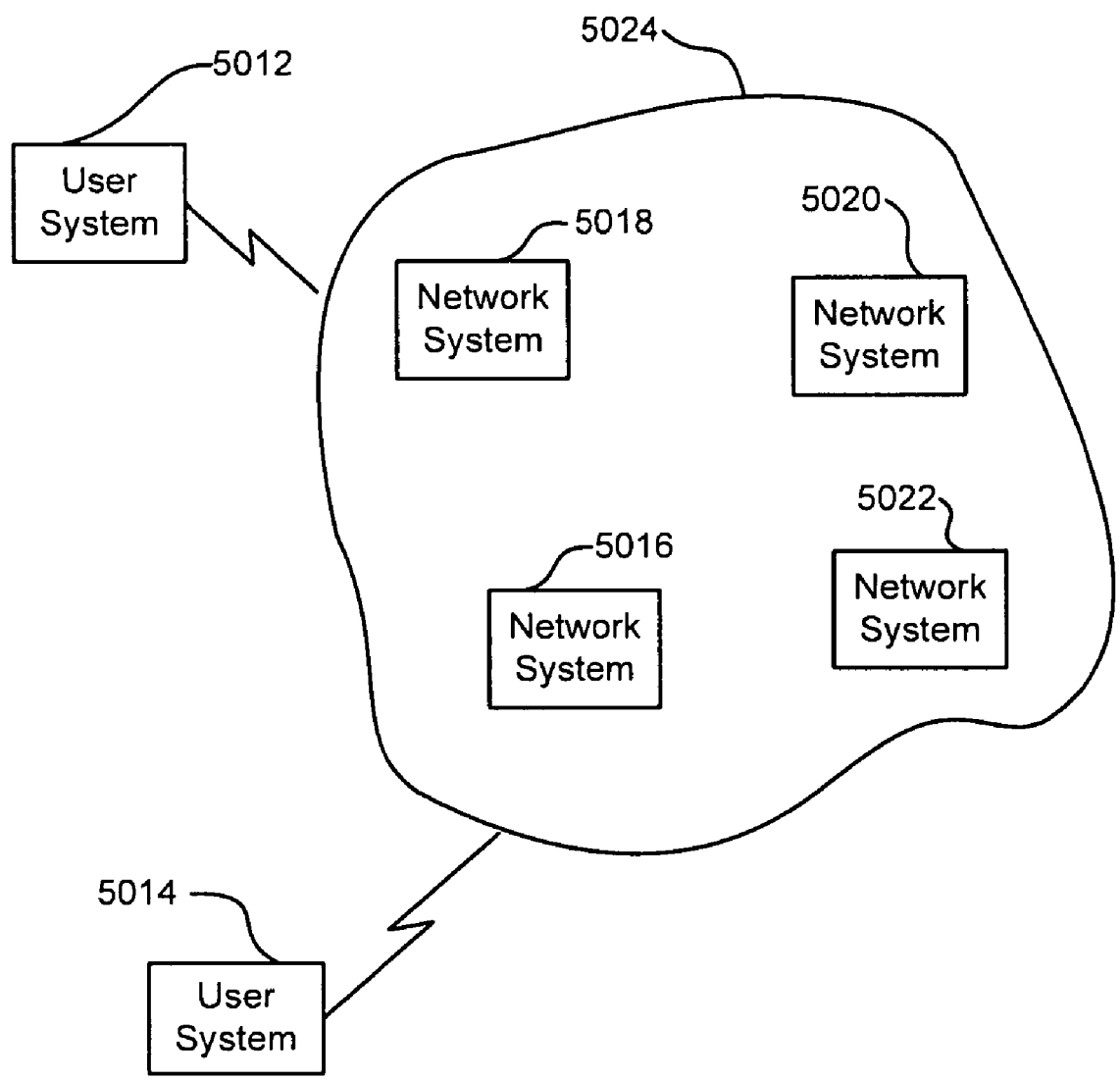
FIG. 16 is a block diagram of an exemplary framework.

As shown in FIG. 16, an exemplary continuously data forwarding framework 5010 includes two user systems 5012, 5014 (also referred to as client systems) coupled to a number of network systems 5016, 5018, 5020, 5022 (also referred to as servers). Each of the network systems 5016, 5018, 5020, 5022 is considered to be a node in a network 5024 and one such network system may be designated as a host or central server, such as network system 5016. As such, network system 5016 may assume a control position in network 5024. Each of the nodes 5016, 5018, 5020, 5022 can be established as a privately controlled network of peers under direct control of the central server 5016. Peered nodes can also be a mix of private and public nodes (e.g., the Internet), and thus not under the direct physical control of the central server 5016. The network 5024 can also be wholly public where the central server 5016 (or servers) has no direct ownership or direct physical control of any of the peered nodes.

The framework 5010 supports communications between computer users, such as users on user systems 5012, 5014. Computer users on user systems 5012, 5014 are distributed geographically and communicate using one or more of the network systems 5016, 5018, 5020, 5022 in network 5024. User systems 5012, 5014 are connected to network 5024 through various communication mediums.

Each of the user systems 5012, 5014 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. User systems 5012, 5014 may receive instructions from, for example, a software application, a program, a piece of code, a device, a computer, a computer system, or a combination thereof, which independently or collectively direct operations, as described herein. These instructions may take the form of one or more communications programs that facilitate communications between the users of client systems 5012, 5014. For instance, such communications programs may include E-mail programs, Instant Messaging (IM) programs, File Transfer Protocol (FTP) programs, Voice-over-Internet (VoIP) programs, as so forth. The instructions may be embodied permanently or temporarily in any type of machine, component, equipment, storage medium, or propagated signal that is capable of being delivered to the client systems 5012, 5014.

Clients systems 5012, 5014 include a communications interface (not shown) used by the communications programs to send communications through network 5024. The communications may include E-mail, audio data, video data, general binary data, or text data (e.g., encoded in American Standard Code for Information Interchange (ASCII) format).

The network 5024 can include a series of portals interconnected through a coherent system. Examples of the network 5024 include the Internet, Wide Area Networks (WANs), Local Area Networks (LANs), analog or digital wired and wireless telephone networks (e.g. a Public Switched Telephone Network (PSTN)), an Integrated Services Digital Network (ISDN), a Digital Subscriber Line (xDSL)), or any other wired or wireless network. The network 5024 may include multiple networks or sub-networks, each of which may include, for example, a wired or wireless data pathway.

A host server 5016 may be connected to network 5024 and may be used to facilitate some direct or indirect communications between the client systems 5012, 5014. As with the client systems 5012, 5014, host server 5016 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Host server 5016 may receive instructions from, for example, a software application, a program, a piece of code, a device, a computer, a computer system, or a combination thereof, which independently or collectively direct operations, as described herein. These instructions may take the form of one or more communications programs. For instance, such communications programs may include E-mail programs, IM programs, FTP programs, VoIP programs, and so forth. The instructions may be embodied permanently or temporarily in any type of machine, component, equipment, storage medium, or propagated signal that is capable of being delivered to the host server 16.

Further, host server 5016 includes a communications interface (not shown) used by the communications programs to send communications through network 5024. The communications may include E-mail, audio data, video data, general binary data, or text data (e.g., encoded in American Standard Code for Information Interchange (ASCII) format).

The user systems 5012, 5014 can execute an instant messaging (IM) client program. IM programs typically enable users to communicate in real-time with each other in a variety of ways. Most IM programs provide, for example:

(1) Instant messages—send notes back and forth with a friend who is online (2) Chat—create a chat room with friends or co-workers (3) Web links—share links to your favorite Web sites (4) Video—send and view videos, and chat face to face with friends (5) Images—look at an image stored on your friend's computer (6) Sounds—play sounds for your friends (7) Files—share files by sending them directly to your friends (8) Talk—use the Internet instead of a phone to actually talk with friends (9) Streaming content—real-time or near-real-time stock quotes and news

(10) Mobile capabilities—send instant messages from your cell phone

Examples of IM communications include those provided by AIM (America Online® Instant Messenger), Yahoo® Messenger, MSN® Messenger, and ICQ®, and so forth.

The framework 5010 supports these IM communications and enables users to store video, images, sounds, files and other content, which can be included in IM communications. When a request to store data is received by the central server 5016 from one of the user systems 5012, 5014, data is directed to a node in the network 5024 where it is then continuously forwarded from node memory to node memory in the network 5024 without storing on any physical storage medium such as a disk drive.

In a like manner, when a request to retrieve data is received by the central server 5016 from a user system 5012, 5014, the requested data, which is being forwarded from node memory to node memory in the network 5024, is retrieved.

Figure 17:
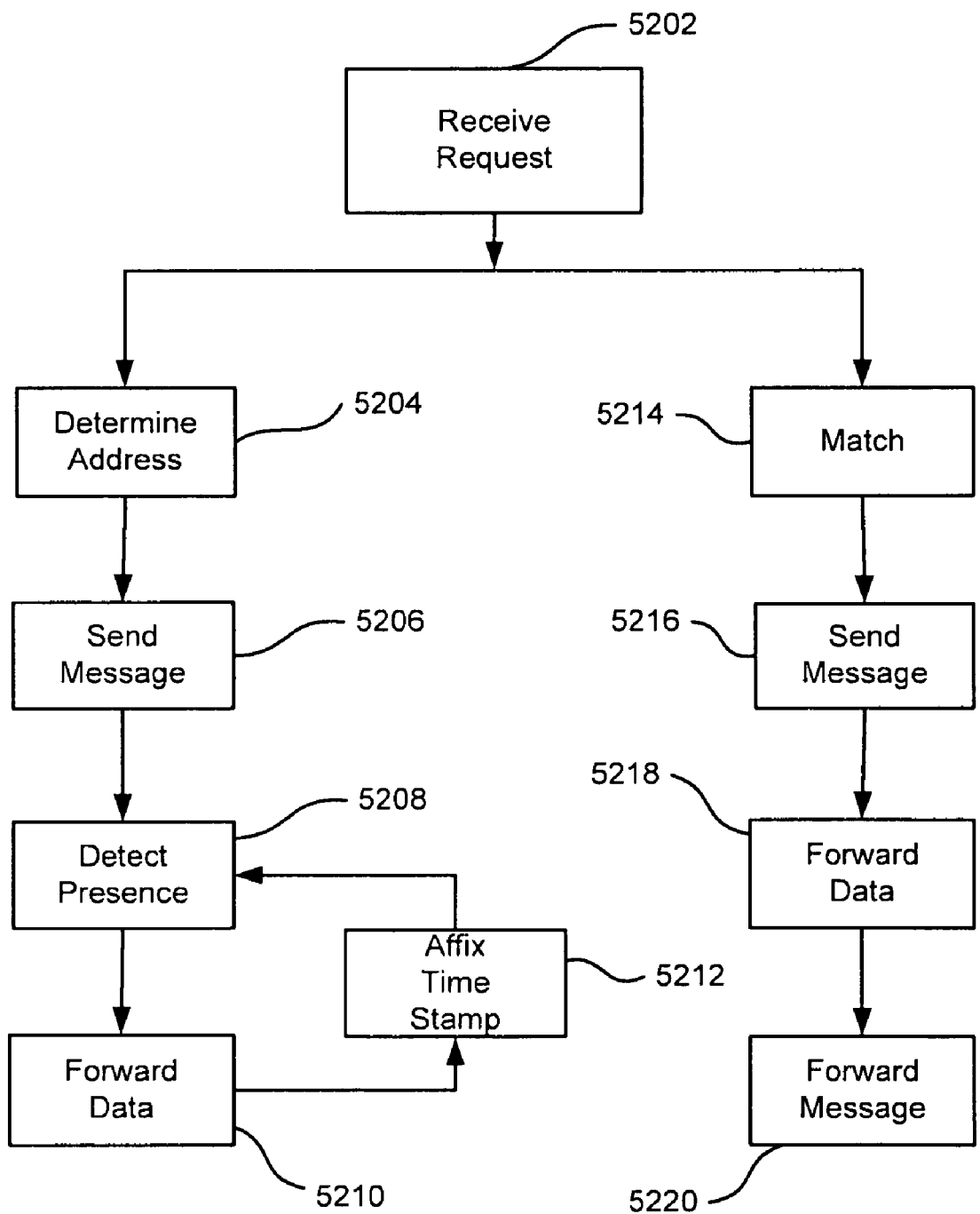
FIG. 17 is a flow diagram.

FIG. 17 illustrates a process 5200 that resides on each of the network nodes 5016, 5018, 5020, 5022 that facilitates data forwarding. Process 5200 includes receiving (5202) a request from a user system to store or retrieve data. If the received request is a request to store data, process 5200 determines (5204) an address of a node available to receive the data in memory. This determination (5204) can include pinging the network and determining which of the nodes in a network is available, or determining which node in the network has the least traffic, or determining which node in the network has the largest available memory, or any combination of these or other factors.

Process 5200 sends (5206) a message to the user system with the address of a specific node for the requester to forward the data.

Process 5200 detects (5208) the presence of data in node memory. Process 5200 forwards (5210) the data in memory to another node in the network of nodes and continues to repeat detecting (5208) and forwarding (5210) of the data from node memory to node memory. When data arrives in any node memory, process 5200 affixes (5212) a time stamp to the data. Additionally, as data enters and exits any mode memory, the data may be encrypted and de-encrypted.

Forwarding (5210) can include pinging the node in the network to determine which of the nodes in the network is available, or determining which node in the network has the least traffic, or determining which node in the network has the largest available memory, or any combination of these or other factors.

If the received request is a request to retrieve data being continuously forwarded from node memory to node memory, process 5200 matches (5214) at the central server 5016 using a hash mark or other unique code that can be "sniffed" by the node upon the data entering the node via the encryption handshake. This can occur by pinging the nodes in the network. Process 5200 sends (5216) the message to return the data to the user directly to the node or node state where the central server 5016 believes the data will likely appear. The more the central server 5016 can narrow the node state that it pings to, then the more efficient the retrieval will become and the less burdened by unnecessary messaging traffic to nodes that are not necessary for a transaction between the central server 16 and the node capable of forwarding the data.

Once the correct node receives the message to forward the data in node memory to the requester, process 5200 forwards (5218) the data in node memory to the requester and forwards (5220) a confirmation message that the data has been sent to the user. This routing message may be sent directly to the central server 5016 or may be passed to the central server 5016 or servers via other node(s) or supernode(s) in the network 5024. Upon the user receiving the requested data the user's application functions to automatically ping the central server 5016 that the data requested has been received. Thus the network 5024 creates data storage without caching, downloading and/or storing the data on any physical storage medium. Data storage and management is accomplished via a continuously routing of the data from node memory to node memory.

Figure 18:
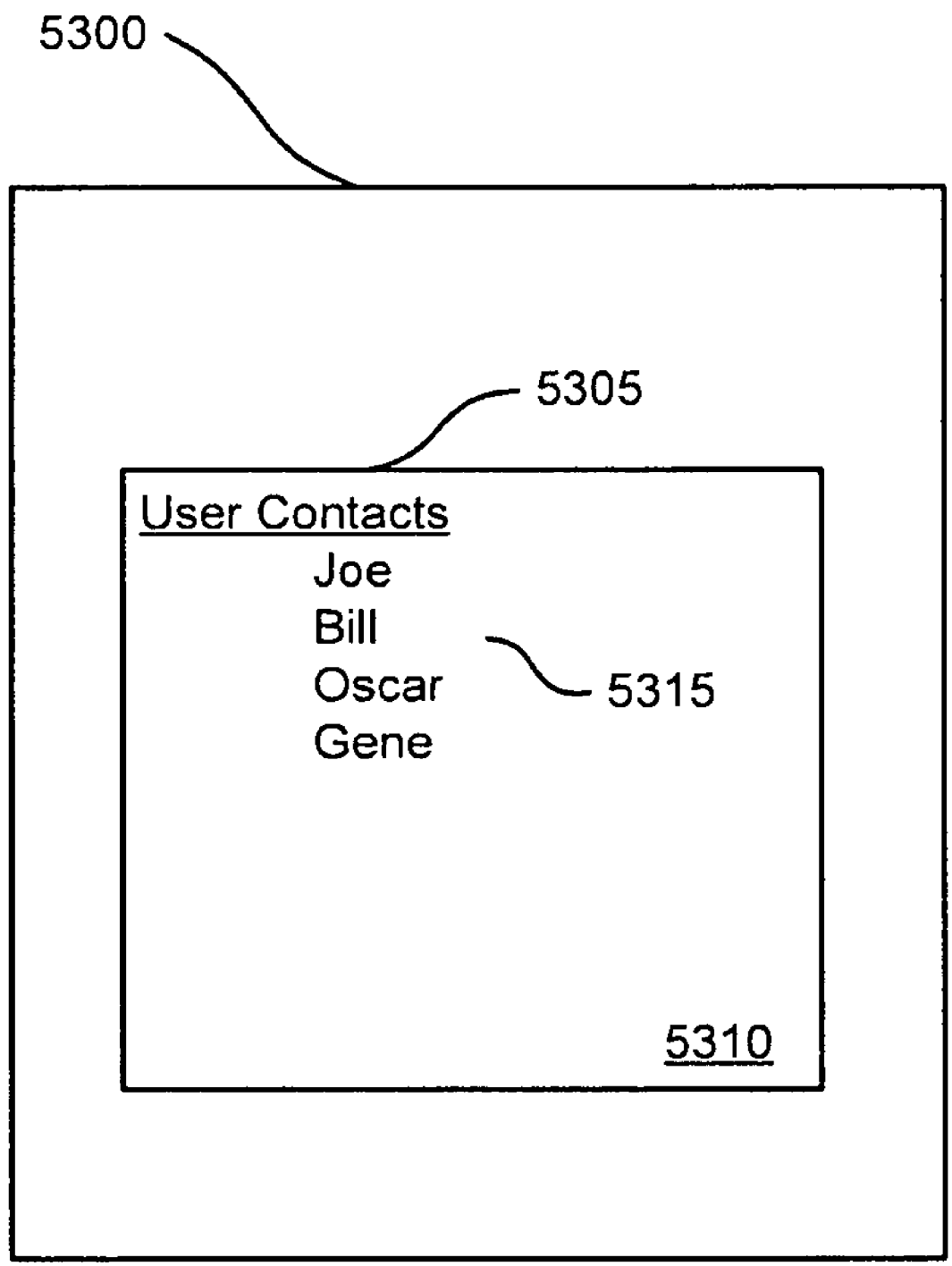
FIG. 18 is an exemplary instant messaging user interface.

FIG. 18 illustrates an example interface presented to a user of one of the client systems 5012, 5014 when running an instant messaging client program. In one embodiment, a user interface 2000 (discussed further below) may run on one or both of client systems 5012, 5014. UI 2000 may include the interfaces and functionality described for FIG. 18 and otherwise herein for this real-time communications embodiment.

As described above, instant messaging programs typically enable users to communicate in real-time with each other in a variety of ways. For example, many instant messaging programs enable users to send text as an instant message, to transfer files, and to communicate by voice.

Shown is a desktop 5300 with a user interface 5305 of the instant messaging client program. User interface 5305 has a text box 5310 that displays representations 5315 of the program user's contacts or buddies (both terms are used interchangeably herein), which are other users of an instant messaging program with whom the program user desires to communicate and interact. The representations 5315 may provide contextual information to the program user about the buddy, such as whether the contact is online, how long the contact has been online, whether the contact is away, or whether the contact is using a mobile device.

The list of contacts displayed in text box 5310 of user interface 5305 typically is referred to as the contact list or buddy list. The IM program user can typically add or remove contacts from the contact list. In the example shown, the representations 5315 are text icons showing the screen names of the contacts.

Instant messaging programs may use an instant messaging server to assist in communications between users of the instant messaging program. The instant messaging server may be implemented, for example, using host server 5016. When a user is connected to the network and executes the instant messaging program, the instant messaging program contacts the host server 5016 and logs the user onto the host server 5016. The host server 5016 informs the instant messaging program when the program user's contacts are online and facilitates communications between the program user and an online contact.

The host server 5016 may support IM services irrespective of a program user's network or Internet access. Thus, host server 5016 may enable users to send and receive IMs, regardless of whether they have access to any particular Internet service provider (ISP). The host server 5016 also may support associated services, such as administrative matters, advertising, directory services, chat, and interest groups related to IM. To transfer data, the host server 5016 employs one or more IM protocols.

To begin an IM session, the IM client program running on a client system 5012, 5014 establishes a connection with the host server 5016 and logs onto the host server 5016. Once a session is established, a user can use the IM client program to view whether particular buddies are online, exchange IMs with particular buddies, participate in group chat rooms, trade files such as pictures, invitations or documents. The IM program user also may be able to find other buddies with similar interests, get customized information such as news and stock quotes, and search the World Wide Web.

Host server 5016 may assist IM communications between users of IM client programs by facilitating the establishment of a peer-to-peer communication session between the IM client programs. Or the host server 5016 may assist IM communications by directly routing communications between the IM client programs.

When a contact is online, the IM program user can communicate or interact with the contact in a number of ways. For instance, the IM program user can send an instant message to the contact (typically in the form of text).

Sending a message opens up a window in which messages can be typed back-and-forth between the IM program user and the contact. Similarly, the IM program user also can send a file or other content to the contact.

To initiate these actions for a contact, the IM program user performs operations on the representation of the contact displayed in user interface 5305. The program then executes the corresponding action in response to the operation performed on the representation. For example, an instant message might be initiated by double-clicking on a contact's representation. Or, a file transfer might be initiated by the IM program user selecting the contact's representation to bring up a context menu and choosing "send a file" from the menu.

Other actions can be executed in response to operations performed on the representation of the contact displayed in interface 5305. For instance, a "buddy icon" can be set for the contact such that communications with the contact display the buddy icon. In addition, for example, profile information about the contact can be retrieved, an alert can be set to inform the program user when the contact is online, a VoTP communication session can be established, or an e-mail can be sent.

User interface 5305 may have icons 5330 to help a user set various options or perform operations in the instant messaging program.

While the techniques have been described primarily with IM applications, they may be applied to other communications programs such as FTP programs, e-mail programs, voice-over-IP (VoIP) or other telephony programs, or players for streaming media.

Geolocation

In one embodiment, user interface 2000 may be used to interact with and control one or more functions of a geolocation assisted data forwarding storage system, described further below. In this embodiment, when a request to store data is received by central server 14 from storage process 100, data is directed to a node in the network 10, assisted by a geolocation of the node, where it is then continuously forwarded as described above. Using geolocation enables speed and efficiency in forwarding data throughout the network, i.e., by selecting nodes that are proximate to each other and/or the user.

Geolocation generally refers to identifying a real-world geographic location of an Internet connected computer, mobile device, website visitor or other. Geolocation can be used to refer to the practice of assessing the location, or it can be used to refer to the actual assessed location or location data. Geolocation can be performed by associating a geographic location with, for example, the Internet Protocol address, Media Access Control (MAC) address, Radio Frequency Identification (RFID), hardware embedded article/production number, embedded software number (such as UUID, Exif/IPTC/XMP or modem steganography), Wi-Fi connection location, or device GPS coordinates, or other, perhaps self-disclosed, information.

Networks in general, and more particularly the Internet, have become a collection of resources meant to appeal to a large general audience. Although this multitude of information has been a great boon, it also has diluted the importance of geographically localized information. Offering the ability for network users to garner information based on geographic location can decrease search times and increase visibility of local establishments. Similarly, user communities and chatrooms can be enhanced through knowing the locations (and therefore, local times, weather conditions and news events) of their members as they roam the globe. It is possible to provide user services in applications and Web sites without the need for users to carry GPS receivers or even to know where they themselves are.

Geolocation by IP address is the technique of determining a user's geographic latitude, longitude and, by inference, city, region and nation by comparing the user's public Internet IP address with known locations of other electronically neighboring servers and routers.

Possible applications for geolocation by IP address exist for Weblogs, chat programs, user communities, forums, distributed computing environments, security, urban mapping and network robustness.

Although several methods of geographically locating an individual currently exist, each system has cost and other detriments that make them technology prohibitive in computing environments. Global Positioning System (GPS) is limited by line-of-sight to the constellation of satellites in Earth's orbit, which severely limits locating systems in cities, due to high buildings, and indoors, due to complete overhead blockage. Several projects have been started to install sensors or to use broadcast television signals to provide for urban and indoor geolocation.

By contrast, these environments already are witnessing a growing trend of installing wireless access points (AP). Airports, cafes, offices and city neighborhoods all have begun installing wireless APs to provide Internet access to wireless devices. Using this available and symbiotic infrastructure, geolocation by IP address can be implemented immediately.

Several RFC proposals have been made by the Internet Engineering Task Force (IETF) that aim to provide geolocation resources and infrastructure. Several companies now offer pay-per-use services for determining location by IP.

Several years ago, CAIDA, the Cooperative Association for Internet Data Analysis, began a geolocation by IP address effort called NetGeo. This system was a publicly accessible database of geographically located IP addresses. Through the use of many complex rules, the NetGeo database slowly filled and was corrected for the location of IP addresses.

To query the NetGeo database, an HTTP request is made with the query IP address, like this:

----

$ http://netgeo.caida.org/perl/netgeo.cgi?target=192.168.0.1

VERSION=1.0

TARGET: 192.168.0.1

NAME: IANA-CBLK1

NUMBER: 192.168.0.0-192.168.255.255

CITY: MARINA DEL REY

STATE: CALIFORNIA

COUNTRY: US

LAT: 33.98

LONG: −118.45

LAT_LONG_GRAN: City

LAST_UPDATED: 16 May 2001

NIC: ARIN

LOOKUP_TYPE: Block Allocation

RATING:

DOMAIN_GUESS: iana.org

STATUS: OK

----

The NetGeo response includes the city, state, country, latitude and longitude of the IP address in question. Furthermore, the granularity (LAT_LONG_GRAN) also is estimated to give some idea about the accuracy of the location. This accuracy also can be deduced from the LAST_UPDATED field. Obviously, the older the update, the more likely it is that the location has changed. This is true especially for IP addresses assigned to residential customers, as companies holding these addresses are in constant flux.

Several existing packages assist in retrieving information from the NetGeo database. The PEAR system has a PHP package, and a PERL module, CAIDA::NetGeo::Client, is available. It is a relatively straightforward task to make a request in whatever language you are using for your application or service. For example, a function in PHP for getting and parsing the NetGeo response looks like this:

----

```
1: function getLocationCaidaNetGeo(Sip)
2: {
3:          $NetGeoURL="http://netgeo.caida.org/perl/netgeo.cgi?target=".Sip;
4: 5: if($NetGeoFP=fopen($NetGeoURL,r))
6: {
7: ob_start( );
8:
9: fpassthru($NetGeoFP);
10: $NetGeoHTML=ob_get contents( );
11: ob_end_clean( );
12:
13: fclose($NetGeoFP);
14:}
15: preg_match ("/LAT:(.*)/i", $NetGeoHTML, $temp) or die("Could not find element LAT");
16: $location[0]=$temp[1];
17: preg_match ("/LONG:(.*)/i", $NetGeoHTML, $temp) or die("Could not find element LONG");
18: $location[1]=$temp[1];
19:
20: return $location;
21:}
```

----

The NetGeo database slowly is becoming more inaccurate as IP address blocks change hands in company close-outs and absorptions. Several other tools are available for determining location, however. A description of the NetGeo infrastructure itself presents some of the methods it employed for mapping IP addresses and can be a source of guidance for future projects.

One of the most useful geolocation resources is DNS LOC information, but it is difficult to enforce across the Internet infrastructure. RFC 1876 is the standard that outlines "A Means for Expressing Location Information in the Domain Name System." Specifically, this is done by placing the location information of a server on the DNS registration page. Several popular servers have employed this standard but not enough to be directly useful as of yet.

To check the LOC DNS information of a server, you need to get the LOC type of the host:

----

$ host -t LOC yahoo.com yahoo.com LOC 37 23 30.900 N 121 59 19.000 W 7.00 m 100 m 100 m 2 m This parses out to 37 degrees 23' 30.900" North Latitude by 121 degrees 59' 19.000" West Longitude at 7 meters in altitude, with an approximate size of 100 meters at 100 meters horizontal precision and 2 meters vertical precision. There are several benefits to servers that offer their geographic location in this way. First, if you are connecting from a server that shows its DNS LOC information, determining your geolocation is simple, and applications may use this information without further work, although some verification may be useful. Second, if you are connecting on your second or third bounce through a server that has DNS LOC information, it may be possible to make an estimate of your location based on traffic and ping times. However, these estimates greatly degrade accuracy.

It also is possible to put the DNS LOC information for your Web site in its registration. If more servers come to use LOC information, geolocation accuracy will be much easier to attain.

"host" is a DNS lookup utility that allows users to find out various pieces of information about a host. The simplest use is doing hostname to IP address lookups and the reverse. The reverse, dotted-decimal IPv4 notation, is used for this, and the actual server that hosts the canonical name is returned. The type flag, -t, can be used to obtain specific information from the host record from the name server.

Service providers typically provide an internal naming scheme for assigning IP addresses and associating names with these addresses. Typically, the canonical name of an IP address contains the country-code top-level domain (ccTLDs) in a suffix. CN is China, FR is France, RO is Romania and so on. Furthermore, the name even may contain the city or region in which the IP address is located. Often, however, this information is shortened to some name that requires a heuristic to determine. For example, in your service or application, a user may appear to be coming from d14-69-1-64.try.wideopenwest.com. A who is at this address reveals it is a WideOpenWest account from Michigan. Using some logic, it is possible to deduce that this user is connecting through a server located in Troy, Mich., hence the .try. in the canonical name.

Some projects have been started to decipher these addresses, and you also can get all of the country codes and associated cities and regions of a country from the IANA Root-Zone Whois Information or the US Geospatial Intelligence Agency, which hosts the GEOnet Names Server (GNS). The GNS has freely available data files on almost all world countries, regions, states and cities, including their sizes, geographic locations and abbreviations, as well as other information.

Information such as that presented on the GNS also can be used to provide users with utilities and services specific to their geographical locations. For example, it is possible to determine a user's local currency, time zone and language. Time zone is especially useful for members of a community or chat group to determine when another friend may be available and on-line.

In this embodiment, the central server 14 is assisted in finding an appropriate address by a geolocation, which can help locate a node that is underutilized or light in terms of network traffic. When process 200 determines (204) an address of a node available to receive the data in memory assisted by its geolocation, this determination (204) can include using a geolocation to help locate a node, or determining which node in the network has the largest available memory, or the geographic coordinates of the node, or any combination of these or other factors. Using geolocation enables greater speed and efficiency by selecting nodes that are proximate to each other and/or the user.

In this embodiment, process 200 forwards (210) the data in memory to another node in the network of nodes, assisted by geolocation (e.g., a location of the node in the network) and continues to repeat detecting (208) and forwarding (210) of the data from node memory to node memory assisted by geolocation.

Closing

The invention can be implemented to realize one or more of the following advantages. A network creates data storage without caching or downloads. Data storage and management are accomplished via a constant routing of the data.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method comprising:
   in a user system having a user interface, the user system configured to communicate with a network of interconnected computer system nodes, sending a request, initiated from the user interface, from the user system to store at least one data item on the network of interconnected computer system nodes;
   sending the at least one data item to a node in the network of interconnected computer system nodes; and
   controlling at least one function, via the user interface, of storage of the at least one data item in the network of interconnected computer system nodes, wherein in response to the request from the user system the at least one data item is continuously forwarded among the nodes in the network of interconnected computer system nodes without storing the forwarded at least one data item on any fixed storage medium in the network, the forwarded at least one data item being constantly routed within the network from node to node, and each of the forwarded at least one data item being available for retrieval if a request to retrieve the data is received, and wherein the user interface is configured to display information regarding file storage in the network of interconnected computer system nodes.

2. The method of claim 1 wherein each node of the network of interconnected computer system nodes is configured to detect the presence of the at least one data item at the node, apply a time stamp, and forward the at least one data item to another node in the network of interconnected computer system nodes according to a node's availability.

3. The method of claim 1 further comprising retrieving, in response to a request via the user interface, the at least one data item being continuously forwarded among the nodes.

4. The method of claim 1 wherein the at least one data item comprises a data file listed in the displayed information regarding file storage, and further comprising:
   accepting a user request in the user interface to delete the data file; and
   sending a delete data file request from the user system to a central server in the network of interconnected computer system nodes.

5. The method of claim 1 wherein the user interface comprises one or more input or output modalities, used to control the at least one function, selected from one or more of the following: a graphical wheel format, a cubed shape, a three-dimensional representation or graphic, a keypad format, a voice-activated input, a circular button, a box, a virtual world graphical interface, an intuitive interface for execution of network functions, and an interface that executes one or more network functions via any combination of the foregoing input or output modalities.

6. The method of claim 1 wherein the displayed information regarding file storage comprises a geographic location of files or an identification of one or more networks associated with storage of the at least one data item.

7. The method of claim 1 wherein the at least one data item comprises one or more files, and the at least one controlled function comprises moving the one or more files from one storage location to another storage location.

8. The method of claim 1 further comprising displaying information on the user interface regarding storage of any files in a fixed storage medium.

9. A tangible computer readable medium embodying instructions for causing a data processing apparatus to perform a method for communication by a user system, having a user interface, with a network of interconnected computer system nodes, the method comprising:
   sending a request, initiated from the user interface, from the user system to store at least one data item on the network of interconnected computer system nodes;
   sending the at least one data item to a node in the network of interconnected computer system nodes;
   controlling at least one function, via the user interface, of storage of the at least one data item in the network of interconnected computer system nodes, wherein in response to the request from the user system the at least one data item is continuously forwarded among the nodes in the network of interconnected computer system nodes without storing the forwarded at least one data item on any fixed storage medium in the network, the forwarded at least one data item being constantly routed within the network from node to node, and each of the forwarded at least one data item being available for retrieval if a request to retrieve the data is received; and
   displaying information on the user interface regarding file storage in the network of interconnected computer system nodes.

10. The computer readable medium of claim 9 wherein:
   the user system is a first user system; and
   the method further comprises sending a request, in response to a user request via the user interface, from the first user system to the network of interconnected computer system nodes to retrieve the at least one data item being continuously forwarded among the nodes in the network, the first user system executing a real-time communications client program that establishes a real-time communications session with a second user system executing a real-time communications client program, wherein the user interface provides an input modality to permit a user to display a list of users including a user of the second user system.

11. The computer readable medium of claim 9 wherein:
   the network of interconnected computer system nodes is a first network; and
   the at least one controlled function comprises storing, in response to a user input request on the user interface, a redundant copy of the at least one data item in a second network of interconnected computer system nodes that continuously forwards the copy of the at least one data item among the nodes in the second network without storing the forwarded copy of the at least one data item on any fixed storage medium in the second network.

12. The computer readable medium of claim 9, wherein the method further comprises:
   sending a query, in response to a search query input from a user in the user interface, to a central server in the network of interconnected computer system nodes;
   displaying, using the user interface, a generated list of file names corresponding to the user's search query; and
   accepting an input from the user on the user interface to select one of the file names.

13. The computer readable medium of claim 9 wherein displaying information on the user interface regarding file storage comprises displaying in one or more of the following forms: Flash, HTML, or displaying via at least one script.

14. The computer readable medium of claim 9 wherein the displayed information regarding file storage comprises a geographic location of files or an identification of one or more networks associated with storage of the at least one data item.

15. The computer readable medium of claim 9 wherein the at least one data item comprises one or more files, and the at least one controlled function comprises moving the one or more files from one storage location to another storage location.

16. The computer readable medium of claim 9 wherein the method further comprises displaying information on the user interface regarding storage of any files in a fixed storage medium.

17. A user system, configured to communicate with a network of interconnected computer system nodes, the user system comprising a tangible input/output device including a user interface configured to:
   initiate the sending of a request from the user system to store at least one data item on the network of interconnected computer system nodes;
   control at least one function of storage of the at least one data item in the network of interconnected computer system nodes, wherein in response to the request from the user system the at least one data item is continuously forwarded among the nodes in the network of interconnected computer system nodes without storing the forwarded at least one data item on any fixed storage medium in the network, the forwarded at least one data item being constantly routed within the network from node to node, and each of the forwarded at least one data item being available for retrieval if a request to retrieve the data is received; and
   display, via the input/output device, information regarding file storage in the network of interconnected computer system nodes.

18. The user system of claim 17 wherein the user interface is further configured to:
- accept a request from a user to display a list of files that are stored using data forwarding storage; and
- display an indication of the public or private status of each file in the displayed list of the files that are stored using data forward storage.

19. The user system of claim 18 wherein the user interface is further configured to accept input from a user to control the communication of advertising information to the user system from the at least one data item stored in the network of interconnected computer system nodes.

20. The user system of claim 17 wherein the user interface is further configured to accept a request from a user to retrieve the at least one data item being continuously forwarded among the nodes.

* * * * *